(12) United States Patent
Sasaki et al.

(10) Patent No.: US 8,300,357 B1
(45) Date of Patent: Oct. 30, 2012

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Atsushi Iijima, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/310,193

(22) Filed: Dec. 2, 2011

(51) Int. Cl.
*G11B 5/147* (2006.01)
(52) U.S. Cl. .......... 360/123.06; 360/123.11; 360/125.02
(58) Field of Classification Search .......... 360/123.11, 360/123.06, 125.02, 123.02, 123.03
See application file for complete search history.

(56) References Cited

U.S. PATENT DOCUMENTS

| | | | |
|---|---|---|---|
| 6,954,340 B2 | 10/2005 | Shukh et al. | |
| 7,692,894 B2 * | 4/2010 | Kobayashi | 360/123.09 |
| 7,940,495 B2 * | 5/2011 | Sasaki et al. | 360/125.27 |
| 8,035,921 B2 * | 10/2011 | Sunwoo | 360/123.05 |
| 2005/0083608 A1 * | 4/2005 | Watanabe | 360/126 |
| 2005/0128637 A1 | 6/2005 | Johnston et al. | |
| 2005/0280937 A1 * | 12/2005 | Sasaki et al. | 360/126 |
| 2006/0126221 A1 * | 6/2006 | Kobayashi et al. | 360/123 |

FOREIGN PATENT DOCUMENTS

JP A-2006-48921 2/2006

* cited by examiner

*Primary Examiner* — Brian Miller
(74) *Attorney, Agent, or Firm* — Oliff & Berridge, PLC

(57) ABSTRACT

A magnetic head includes first and second coils, a main pole, a first shield, and first and second return path sections. The first shield and the first return path section are located forward of the main pole in the direction of travel of the recording medium. The first return path section connects the main pole and the first shield so that a first space is defined. The second return path section is located backward of the main pole in the direction of travel of the recording medium so that a second space is defined. The first coil includes at least one first coil element passing through the first space. The second coil includes a plurality of second coil elements passing through the second space. The at least one first coil element is smaller in number than the second coil elements.

11 Claims, 13 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a write magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent the adjacent track erasure.

To prevent the adjacent track erasure induced by a skew and provide improved recording densities, it is effective to provide one or more shields in the vicinity of the main pole so as to be adjacent to the main pole with a gap part interposed therebetween. For example, U.S. Pat. No. 6,954,340 B2 and U.S. Patent Application Publication No. 2005/0128637 A1 describe a magnetic head including four shields: one having an end face located in the medium facing surface at a position forward of an end face of the main pole in the direction of travel of the recording medium; another having an end face located in the medium facing surface at a position backward of the end face of the main pole in the direction of travel of the recording medium; and the other two having two end faces located in the medium facing surface at positions on opposite sides of the end face of the main pole in the track width direction. The end faces of the four shields are arranged to wrap around the end face of the main pole in the medium facing surface.

In a magnetic head, a position that is forward of the main pole in the direction of travel of the recording medium is a position on the air-outflow-end side (the trailing end side), whereas a position that is backward of the main pole in the direction of travel of the recording medium is a position on the air-inflow-end side (the leading end side). Hereinafter, a shield having an end face located forward of the end face of the main pole in the direction of travel of the recording medium will be referred to as a trailing shield, and a shield having an end face located backward of the end face of the main pole in the direction of travel of the recording medium will be referred to as a leading shield.

A magnetic head having a shield is typically provided with a return path section for connecting the shield and part of the main pole away from the medium facing surface to each other. In addition, a coil is provided to pass through a space defined by the main pole, the gap part, the shield, and the return path section. The shield and the return path section function to capture a magnetic flux that is produced from the end face of the main pole and spreads in directions other than the direction perpendicular to the plane of the recording medium, and to thereby prevent the magnetic flux from reaching the recording medium. The shield and the return path section also function to allow a magnetic flux that has been produced from the end face of the main pole and has magnetized the recording medium to flow back to the main pole. The magnetic head having the shield and the return path section is capable of preventing adjacent track erasure and provides a further improved recording density.

JP-A-2006-48921A discloses a technology for reducing noise caused by a magnetic flux in a backing layer of a recording medium for a magnetic head having a main pole and at least one auxiliary pole. The magnetic head is provided with a trailing-side exciting coil and a leading-side exciting coil disposed with the main pole therebetween. The two exciting coils are designed to have different numbers of turns so as to produce different magnetomotive forces. JP-A-2006-48921A further discloses an example of the magnetic head including a trailing-side auxiliary pole and a leading-side auxiliary pole disposed with the main pole therebetween. In the magnetic head, the trailing-side exciting coil is disposed between the main pole and the trailing-side auxiliary pole, and the leading-side exciting coil is disposed between the main pole and the leading-side auxiliary pole, with the number of turns of the leading-side exciting coil made greater than that of the trailing-side exciting coil.

The position of an end of a record bit to be recorded on the recording medium depends on the position of an end of the end face of the main pole located in the medium facing surface, the end being located forward in the direction of travel of the recording medium. In order to define the position of the end of the record bit accurately, it is therefore effective to provide the trailing shield, in particular.

In addition, as the frequency of the recording signal is increased in order to increase the recording density, the magnetic head is required to be improved in the rate of change in the direction of the magnetic flux produced from the end face of the main pole. To satisfy this requirement in the magnetic head having the trailing shield, it is particularly effective to reduce the length of a magnetic path that passes through the trailing shield and the main pole. To this end, it is effective to provide a return path section that is located forward of the main pole in the direction of travel of the recording medium and connects the trailing shield and part of the main pole away from the medium facing surface to each other (such a return path section will hereinafter be referred to as the trailing return path section) and to reduce the number of turns of the coil that passes through the space defined by the main pole, the gap part, the trailing shield, and the trailing return path section. However, this would cause a shortage of magnetomotive force produced by the coil, thereby hindering the main pole from producing a write magnetic field of sufficient magnitude.

It has thus been conventionally difficult to allow the main pole to produce a write magnetic field of sufficient magnitude while reducing the length of the magnetic path that passes through the trailing shield and the main pole.

As described above, JP-A-2006-48921A discloses the technology that the two exciting coils, i.e., the trailing-side exciting coil and the leading-side exciting coil disposed with the main pole therebetween, are provided with different numbers of turns so as to produce different magnetomotive forces. The magnetic head disclosed in JP-A-2006-48921A does not include any component that functions as a shield, however. In the magnetic head disclosed in JP-A-2006-48921A, the auxiliary poles are located farther from the main pole than are the exciting coils. In this magnetic head, the distances from the end face of the main pole to the respective end faces of the auxiliary poles are too large for the auxiliary poles to function as shields.

OBJECT AND SUMMARY OF THE INVENTION

It is an object of the present invention to provide a magnetic head for perpendicular magnetic recording that allows the main pole to produce a write magnetic field of sufficient magnitude while allowing a reduction in length of a magnetic path that passes through the main pole and a shield that is located forward of the main pole in the direction of travel of the recording medium.

A magnetic head for perpendicular magnetic recording of the present invention includes: a medium facing surface that faces a recording medium; a first coil and a second coil that produce magnetic fields corresponding to data to be written on the recording medium; a main pole that has an end face located in the medium facing surface, allows magnetic fluxes corresponding to the magnetic fields produced by the first and second coils to pass, and produces a write magnetic field for writing the data on the recording medium by means of a perpendicular magnetic recording system; a first shield made of a magnetic material and having an end face that is located in the medium facing surface at a position forward of the end face of the main pole in a direction of travel of the recording medium; a gap part made of a nonmagnetic material and interposed between the main pole and the first shield; and a first return path section and a second return path section that are each made of a magnetic material.

The first return path section is located forward of the main pole in the direction of travel of the recording medium and connects the first shield and a part of the main pole away from the medium facing surface to each other so that a first space is defined by the main pole, the gap part, the first shield, and the first return path section. The second return path section is located backward of the main pole in the direction of travel of the recording medium so that a second space is defined by the main pole and the second return path section.

The first coil includes at least one first coil element that extends to pass through the first space. The first coil is located forward of the main pole in the direction of travel of the recording medium and wound around a part of the first return path section. No part of the first coil other than the at least one first coil element exists in the first space. The second coil includes a plurality of second coil elements that extend to pass through the second space. The second coil is located backward of the main pole in the direction of travel of the recording medium and wound around a part of the second return path section. No part of the second coil other than the plurality of second coil elements exists in the second space. The minimum distance between the first shield and the main pole is smaller than the minimum distance between the at least one first coil element and the main pole. The at least one first coil element is smaller in number than the plurality of second coil elements.

In the magnetic head for perpendicular magnetic recording of the present invention, the second return path section may include a core part that is located farther from the medium facing surface than are the plurality of second coil elements. The second coil may be wound around the core part. The core part may be connected to the part of the main pole away from the medium facing surface. Alternatively, the core part may have an end face that faces the part of the main pole away from the medium facing surface, and the magnetic head for perpendicular magnetic recording may further include a nonmagnetic layer interposed between the end face of the core part and the part of the main pole away from the medium facing surface.

In the magnetic head for perpendicular magnetic recording of the present invention, the second return path section may have an end face that is located in the medium facing surface at a position backward of the end face of the main pole in the direction of travel of the recording medium. In this case, the second return path section may include a portion interposed between the medium facing surface and the plurality of second coil elements. The second return path section may be connected to the part of the main pole away from the medium facing surface.

In the magnetic head for perpendicular magnetic recording of the present invention, the second return path section may be connected to the part of the main pole away from the medium facing surface, and a first interface may be formed between the first return path section and the main pole, while a second interface may be formed between the second return path section and the main pole. The first interface has a first end that is closest to the medium facing surface. The second interface has a second end that is closest to the medium facing surface. The first end may be located closer to the medium facing surface than is the second end.

The magnetic head for perpendicular magnetic recording of the present invention may further include a second shield made of a magnetic material and having an end face that is located in the medium facing surface at a position backward of the end face of the main pole in the direction of travel of the recording medium. In this case, the second return path section is connected to the second shield. The minimum distance between the second shield and the main pole is smaller than the minimum distance between the main pole and the plurality of second coil elements. The second return path section may connect the second shield and the part of the main pole away from the medium facing surface to each other.

The magnetic head for perpendicular magnetic recording of the present invention may further include two side shields that are each made of a magnetic material and that have two end faces located in the medium facing surface at positions on opposite sides of the end face of the main pole in a track width direction.

In the magnetic head for perpendicular magnetic recording of the present invention, the number of the at least one first coil element is smaller than the number of the plurality of second coil elements. Accordingly, it is possible to reduce the length of the magnetic path that passes through the first shield and the main pole by reducing the number of the at least one first coil element, and it is also possible to enhance the magnetomotive force produced by the second coil by increasing the number of the plurality of second coil elements. Consequently, according to the present invention, it is possible to allow the main pole to produce a write magnetic field of sufficient magnitude while reducing the length of the magnetic path that passes through the first shield and the main pole.

Other objects, features and advantages of the present invention will become fully apparent from the following description.

DETAILED DESCRIPTION OF THE PREFERRED EMBODIMENTS

First Embodiment

Figure 1:
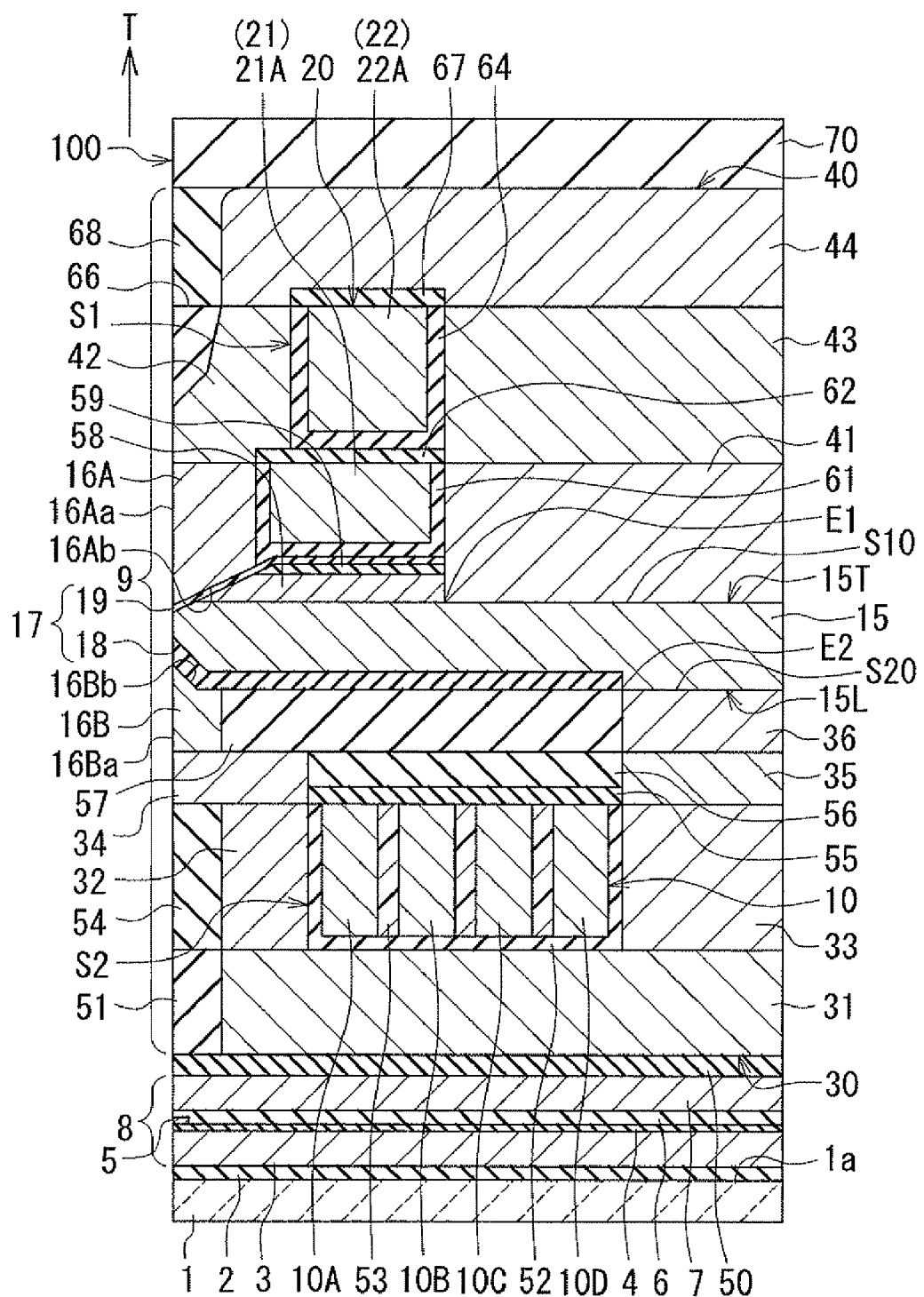
FIG. 1 is a cross-sectional view of a magnetic head according to a first embodiment of the invention.
Figure 2:
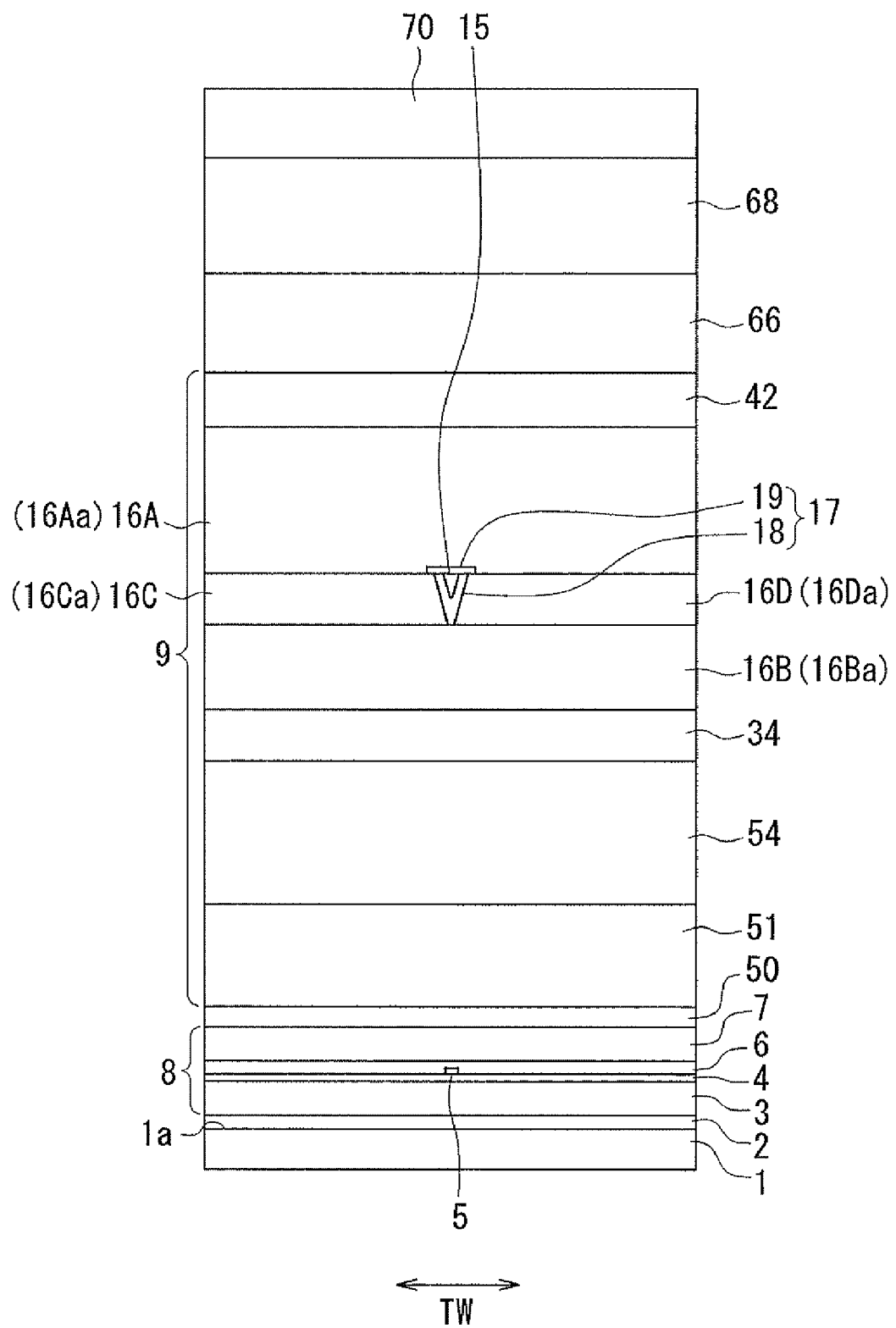
FIG. 2 is a front view showing the medium facing surface of the magnetic head according to the first embodiment of the invention.
Figure 3:
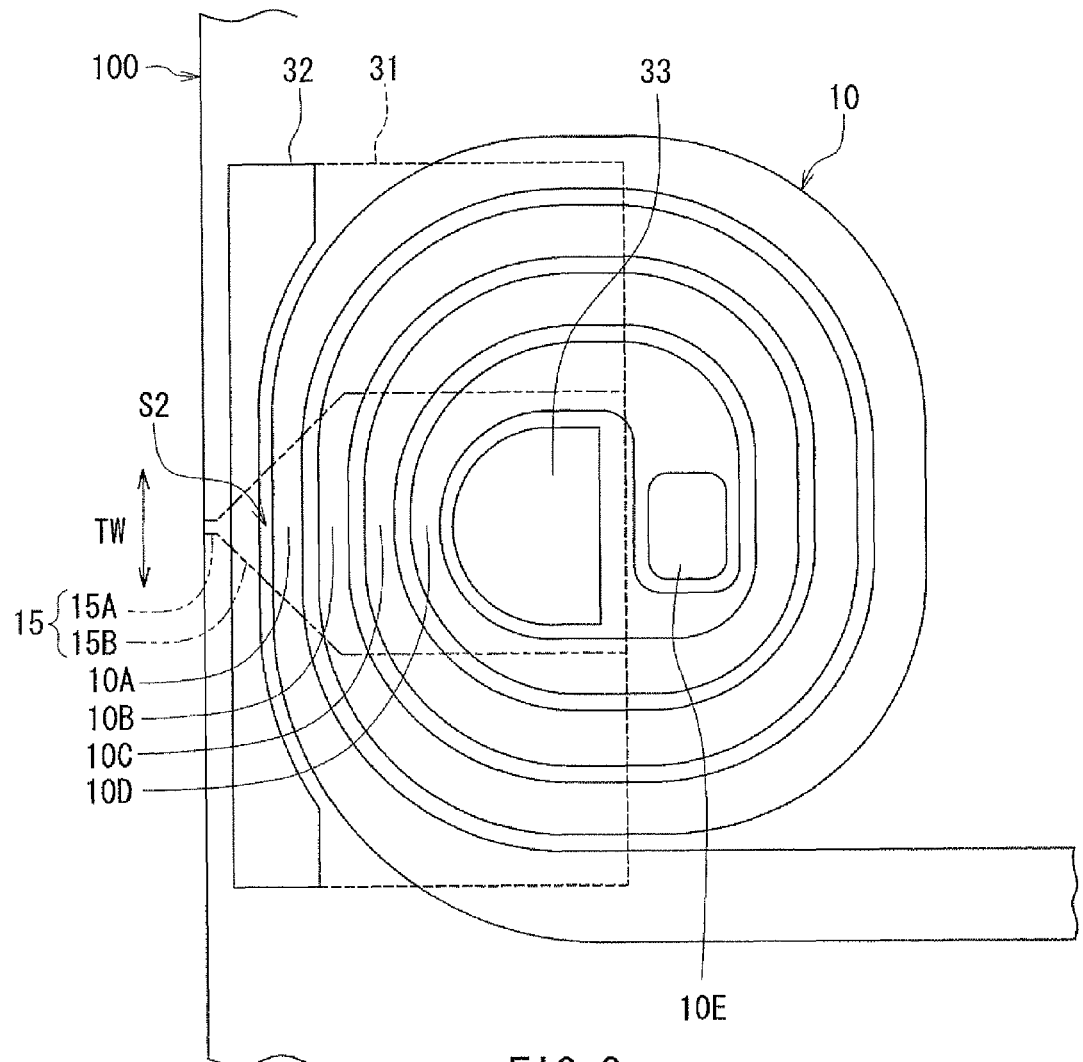
FIG. 3 is a plan view showing a second coil of the magnetic head according to the first embodiment of the invention.
Figure 4:
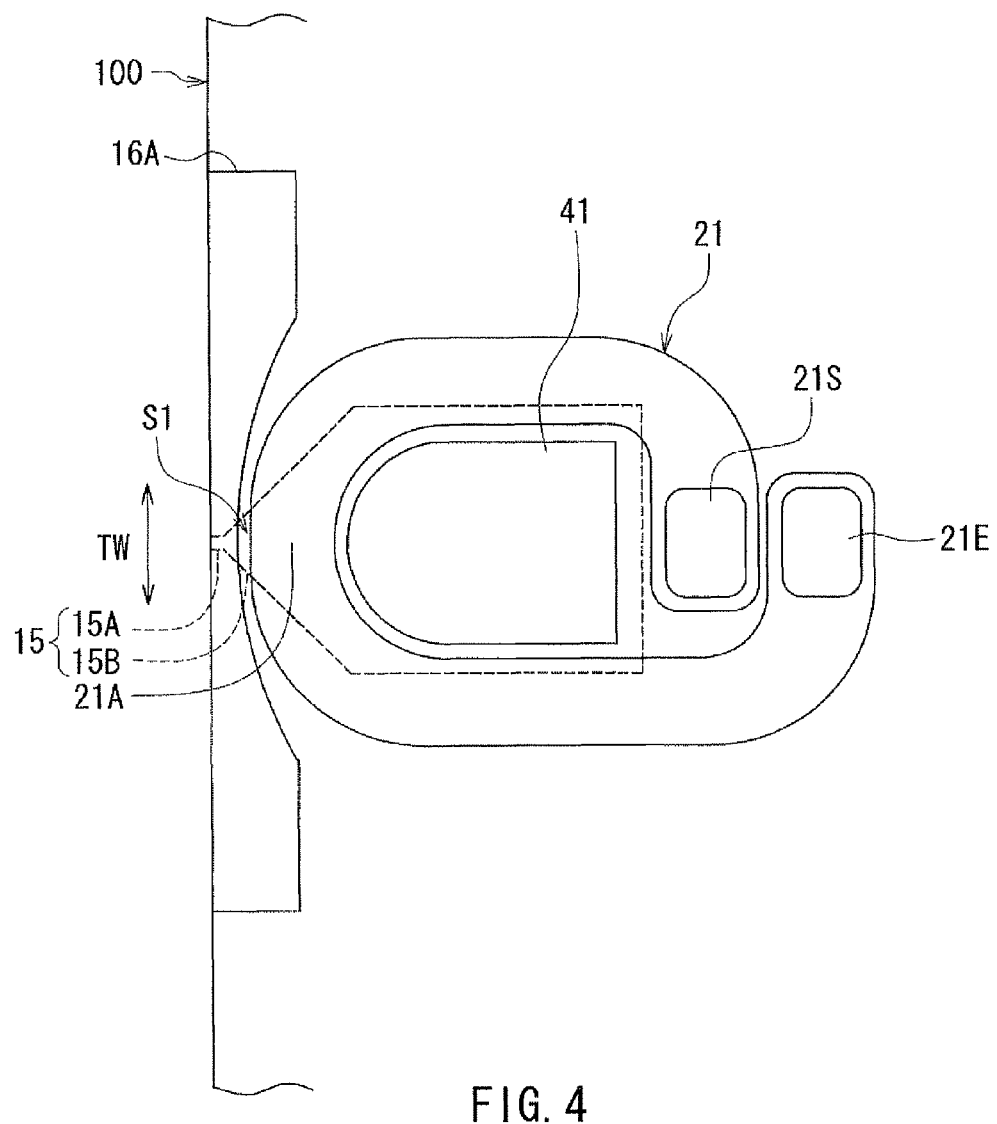
FIG. 4 is a plan view showing a first layer of a first coil of the magnetic head according to the first embodiment of the invention.
Figure 5:
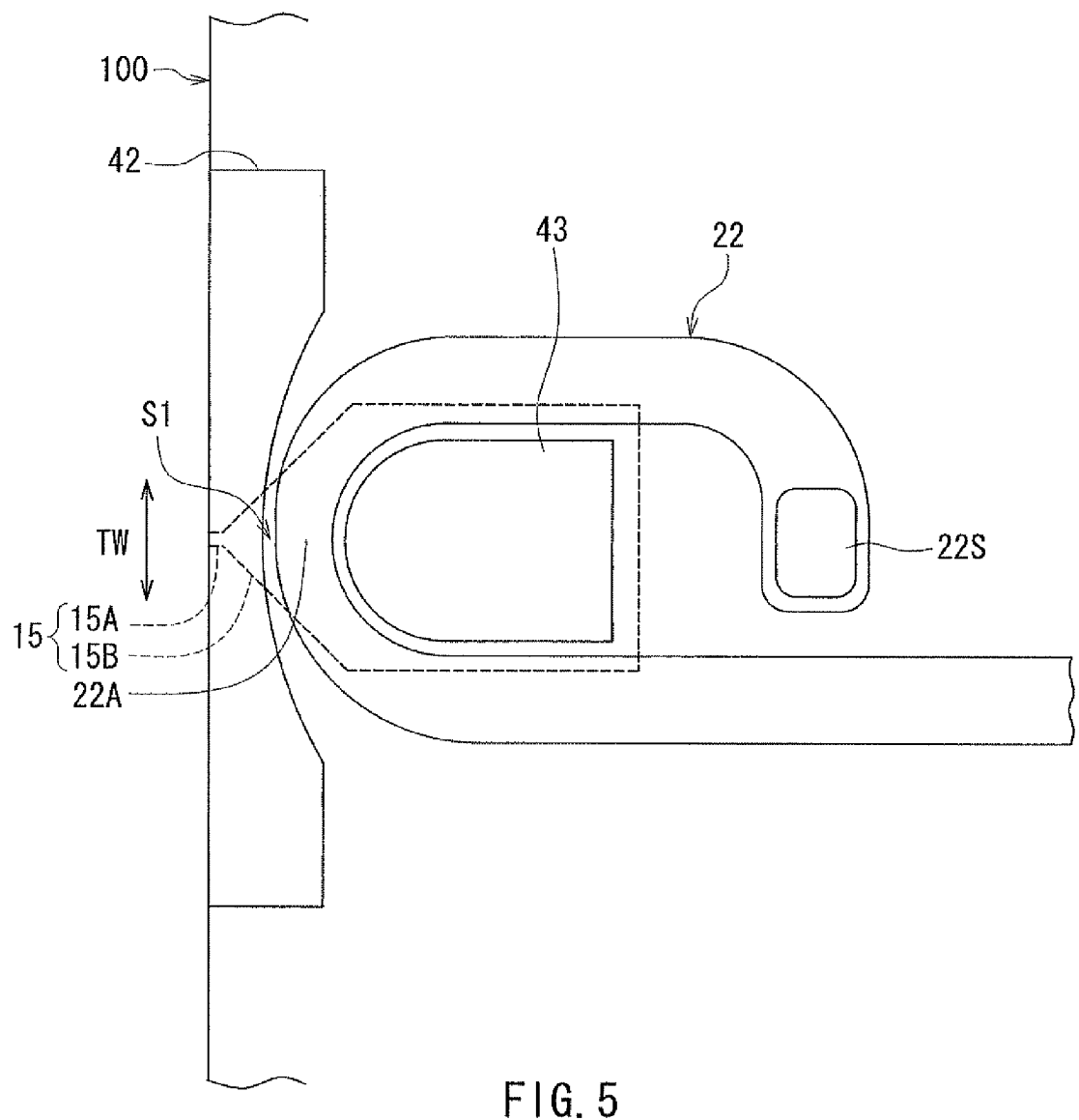
FIG. 5 is a plan view showing a second layer of the first coil of the magnetic head according to the first embodiment of the invention.

Embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view of the magnetic head according to the present embodiment. Note that FIG. 1 show a cross section perpendicular to the medium facing surface and the top surface of the substrate. The arrow with the symbol T in FIG. 1 indicates the direction of travel of the recording medium. FIG. 2 is a front view showing the medium facing surface of the magnetic head according to the present embodiment. FIG. 3 is a plan view showing a second coil of the magnetic head according to the present embodiment. FIG. 4 is a plan view showing a first layer of a first coil of the magnetic head according to the present embodiment. FIG. 5 is a plan view showing a second layer of the first coil of the magnetic head according to the present embodiment. The arrows with the symbol TW in FIG. 2 to FIG. 5 indicate the track width direction.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 100 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes a nonmagnetic layer 50 made of a nonmagnetic material and disposed on the second read shield layer 7, and a write head section 9 disposed on the nonmagnetic layer 50. The nonmagnetic layer 50 is made of alumina, for example. The write head section 9 includes a first coil 20, a second coil 10, a main pole 15, a first shield 16A, a second shield 16B, two side shields 16C and 16D, and a gap part 17.

The first and second coils 20 and 10 produce magnetic fields corresponding to data to be written on the recording medium. The coils 20 and 10 are both made of a conductive material such as copper. The coil 20 and the coil 10 are connected in series or in parallel. The main pole 15 has an end face located in the medium facing surface 100. The main pole 15 allows magnetic fluxes corresponding to the magnetic fields produced by the coils 20 and 10 to pass, and produces a write magnetic field for writing data on the recording medium by means of a perpendicular magnetic recording system. FIG. 1 shows a cross section that intersects the end face of the main pole 15 located in the medium facing surface 100 and that is perpendicular to the medium facing surface 100 and the top surface 1a of the substrate 1 (the cross section will hereinafter be referred to as the main cross section).

Each of the shields 16A, 16B, 16C, and 16D is made of a magnetic material. Examples of materials that can be used for the shields 16A, 16B, 16C, and 16D include CoFeN, CoNiFe, NiFe, and CoFe.

The first shield 16A is located forward of the main pole 15 in the direction T of travel of the recording medium (i.e., located on the trailing end side relative to the main pole 15). The second shield 16B is located backward of the main pole 15 in the direction T of travel of the recording medium (i.e., located on the leading end side relative to the main pole 15). The two side shields 16C and 16D are located on opposite sides of the main pole 15 in the track width direction TW and magnetically couple the first shield 16A and the second shield 16B to each other.

As shown in FIG. 1, the first shield 16A has an end face 16Aa and a first slope 16Ab. The end face 16Aa is located forward of the end face of the main pole 15 in the direction T of travel of the recording medium. The first slope 16Ab serves as a bottom surface. The second shield 16B has an end face 16Ba and a top surface including a second slope 16Bb. The end face 16Ba is located backward of the end face of the main pole 15 in the direction T of travel of the recording medium. The first slope 16Ab and the second slope 16Bb will be described in detail later. As shown in FIG. 2, the two side shields 16C and 16D have two end faces 16Ca and 16Da located on opposite sides of the end face of the main pole 15 in the track width direction TW. In the medium facing surface 100, the end faces 16Aa, 16Ba, 16Ca, and 16Da of the shields 16A, 16B, 16C, and 16D are arranged to wrap around the end face of the main pole 15.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located forward of the main pole 15 in the direction T of travel of the recording medium, and connects the first shield 16A and part of the main pole 15 away from the medium facing surface 100 to each other, thereby magnetically coupling the first shield 16A and the main pole 15 to each other. The second return path section 30 is located backward of the main pole 15 in the direction T of travel of the recording medium. In the present embodiment, in particular, the second return path section 30 connects the second shield 16B and part of the main pole 15 away from the medium facing surface 100 to each other, thereby magnetically coupling the second shield 16B and the main pole 15 to each other.

The second return path section 30 includes magnetic layers 31, 32, 33, 34, 35, and 36. The magnetic layer 31 is located on the nonmagnetic layer 50. The magnetic layers 32 and 33 are both located on the magnetic layer 31. The magnetic layer 32 is located near the medium facing surface 100. The magnetic layer 33 is located farther from the medium facing surface 100 than is the magnetic layer 32. The magnetic layers 31 and 32 have their respective end faces that face toward the medium facing surface 100. These end faces are located at a distance from the medium facing surface 100. As shown in FIG. 3, the second coil 10 is wound approximately four turns around the magnetic layer 33.

The magnetic head further includes an insulating layer 51 made of an insulating material and disposed on the nonmagnetic layer 50 to surround the magnetic layer 31, an insulating film 52 made of an insulating material and interposed between the second coil 10 and the magnetic layers 31 to 33, an insulating layer 53 made of an insulating material and disposed in the space between adjacent turns of the second coil 10, and an insulating layer 54 made of an insulating material and disposed around the second coil 10 and the magnetic layer 32. The top surfaces of the second coil 10, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

The magnetic layer 34 is disposed over the magnetic layer 32 and the insulating layer 54. The magnetic layer 35 is disposed on the magnetic layer 33. The magnetic layer 34 has an end face located in the medium facing surface 100. The magnetic head further includes an insulating layer 55 made of an insulating material and disposed over the top surfaces of the second coil 10, the insulating film 52 and the insulating layers 53 and 54, and an insulating layer 56 made of an insulating material and disposed on the insulating layer 55 to surround the magnetic layers 34 and 35. The top surfaces of the magnetic layers 34 and 35 and the insulating layer 56 are even with each other. The insulating layers 55 and 56 are made of alumina, for example.

The second shield 16B is disposed on the magnetic layer 34. The magnetic layer 36 is disposed on the magnetic layer 35. The magnetic head further includes a nonmagnetic layer 57 made of a nonmagnetic material. The nonmagnetic layer 57 is disposed on part of the top surface of the magnetic layer 34 and on the top surface of the insulating layer 56, and surrounds the second shield 16B and the magnetic layer 36. The nonmagnetic layer 57 is made of alumina, for example.

The main pole 15 has a top surface 15T (see FIG. 1), which is a surface located at a forward end in the direction T of travel of the recording medium, and has a bottom end 15L (see FIG. 1) opposite to the top surface 15T. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is made of a nonmagnetic material and interposed between the main pole 15 and each of the shields 16A, 16B, 16C and 16D. The gap part 17 includes a first gap layer 19 interposed between the main pole 15 and the first shield 16A, and a second gap layer 18 interposed between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D, the top surface of the second shield 16B, and the top surface of the nonmagnetic layer 57. The second gap layer 18 is made of a nonmagnetic material. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18. The second gap layer 18 has an opening for exposing the top surface of the magnetic layer 36.

The main pole 15 is disposed over the second shield 16B and the nonmagnetic layer 57 such that the second gap layer 18 is interposed between the main pole 15 and the top surfaces of the second shield 16B and the nonmagnetic layer 57. As shown in FIG. 2, the second gap layer 18 is interposed also between the main pole 15 and each of the side shields 16C and 16D.

The bottom end 15L of the main pole 15 is in contact with the top surface of the magnetic layer 36 at a position away from the medium facing surface 100. The main pole 15 is made of a magnetic metal material.

Examples of materials that can be used for the main pole 15 include NiFe, CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 100; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58, and the insulating layer 59. The first gap layer 19 is made of a nonmagnetic material. The material employed for the first gap layer 19 may be a nonmagnetic insulating material such as alumina, or a nonmagnetic conductive material such as Ru, NiCu, Ta, W, NiB, or NiP. The first shield 16A is disposed over the side shields 16C and 16D and the first gap layer 19, and is in contact with the top surfaces of the side shields 16C and 16D and the first gap layer 19. In the medium facing surface 100, part of the end face 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes magnetic layers 41, 42, 43, and 44. The magnetic layer 41 is disposed on the main pole 15 at a position away from the medium facing surface 100.

The first coil 20 includes a first layer 21 and a second layer 22. As shown in FIG. 4, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a second nonmagnetic layer (not shown) made of a nonmagnetic material and disposed around the first layer 21 and the first shield 16A. The top surfaces of the first shield 16A, the first layer 21, the magnetic layer 41, the insulating film 61, and the second nonmagnetic layer are even with each other. The magnetic head further includes an insulating layer 62 made of an insulating material and disposed over the top surfaces of the first layer 21 and the insulating film 61. The insulating film 61 and the insulating layer 62 are made of alumina, for example. The second nonmagnetic layer is made of an inorganic insulating material, for example. The inorganic insulating material is alumina or silicon oxide, for example.

The magnetic layer 42 is disposed over the first shield 16A and the insulating layer 62. The magnetic layer 43 is disposed on the magnetic layer 41. The magnetic layer 42 has a front end face located in the medium facing surface 100, a top surface extending in a direction substantially perpendicular to the medium facing surface 100, and first and second connecting surfaces that connect the front end face and the top surface to each other. In the magnetic layer 42, an end of the first connecting surface is located in the medium facing surface 100, the other end of the first connecting surface is connected to an end of the second connecting surface, and the other end of the second connecting surface is connected to the top surface. The distance from the top surface 1a of the substrate 1 to an arbitrary point on each of the first and second connecting surfaces increases with increasing distance from the arbitrary point to the medium facing surface 100. The angle of inclination of the second connecting surface relative to the direction perpendicular to the medium facing surface 100 is greater than that of the first connecting surface relative to the direction perpendicular to the medium facing surface 100.

The second layer 22 is disposed above the first layer 21. As shown in FIG. 5, the second layer 22 is wound approximately one turn around the magnetic layer 43. The magnetic head further includes an insulating film 64 made of an insulating material and interposed between the second layer 22 and each of the magnetic layers 42 and 43 and the insulating layer 62, and an insulating layer 66 made of an insulating material and disposed around the second layer 22 and the magnetic layer 42. The top surfaces of the second layer 22, the magnetic layers 42 and 43, the insulating film 64, and the insulating layer 66 are even with each other. The magnetic head further includes an insulating layer 67 made of an insulating material and disposed over the top surfaces of the second layer 22 and the insulating film 64. The insulating film 64 and the insulating layers 66 and 67 are made of alumina, for example.

The magnetic layer 44 is disposed over the magnetic layers 42 and 43 and the insulating layer 67, and connects the magnetic layer 42 and the magnetic layer 43 to each other. The magnetic layer 44 has an end face facing toward the medium facing surface 100. This end face is located at a distance from the medium facing surface 100. The magnetic head further includes an insulating layer 68 made of an insulating material and disposed around the magnetic layer 44. The insulating layer 68 is made of alumina, for example. The top surfaces of the magnetic layer 44 and the insulating layer 68 are even with each other.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 100, the read head section 8, and the write head section 9. The medium facing surface 100 faces the recording medium. The read head section 8 and the write head section 9 are stacked on the substrate 1. Relative to the write head section 9, the read head section 8 is located backward in the direction T of travel of the recording medium (i.e., located on the leading end side).

The read head section 8 includes: the MR element 5 serving as the read element; the first read shield layer 3 and the second read shield layer 7 for shielding the MR element 5, with their respective portions near the medium facing surface 100 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the first coil 20, the second coil 10, the main pole 15, the first shield 16A, the second shield 16B, the two side shields 16C and 16D, the gap part 17, the first return path section 40, and the second return path section 30. The gap part 17 includes the second gap layer 18 and the first gap layer 19. The first return path section 40 and the second return path section 30 align along the direction perpendicular to the top surface 1a of the substrate 1 with the main pole 15 interposed therebetween.

The second return path section 30 includes the magnetic layers 31 to 36, and is located backward of the main pole 15 in the direction T of travel of the recording medium so that a second space S2 is defined by the main pole 15 and the second return path section 30 (the magnetic layers 31 to 36). In the present embodiment, as shown in FIG. 1, the second return path section 30 connects the second shield 16B and part of the main pole 15 away from the medium facing surface 100 to each other, in particular. Consequently, the second space S2 is defined by the main pole 15, the gap part 17 (the gap layer 18), the second shield 16B, and the second return path section 30 (the magnetic layers 31 to 36).

The magnetic layers 32 and 34 magnetically couple the second shield 16B and the magnetic layer 31 to each other. The magnetic layer 34 is connected to the second shield 16B. The magnetic layer 32 magnetically couples the magnetic layer 34 and the magnetic layer 31 to each other. The magnetic layer 34 has an end face that is located in the medium facing surface 100 at a position backward of the end face of the main pole 15 and the end face 16Ba of the second shield 16B in the direction T of travel of the recording medium. In the main cross section, the magnetic layer 31 is greater than the second shield 16B in length in the direction perpendicular to the medium facing surface 100. In the main cross section, the magnetic layers 32 and 34 are greater than the second shield 16B and smaller than the magnetic layer 31 in length in the direction perpendicular to the medium facing surface 100.

Neither of the magnetic layers 31 and 32 is exposed in the medium facing surface 100. Each of the magnetic layers 31 and 32 has an end face facing toward the medium facing surface 100 and located at a distance from the medium facing surface 100. Part of the insulating layer 51 is interposed between the medium facing surface 100 and the aforementioned end face of the magnetic layer 31. Part of the insulating layer 54 is interposed between the medium facing surface 100 and the aforementioned end face of the magnetic layer 32.

The first return path section 40 includes the magnetic layers 41 to 44, and is located forward of the main pole 15 in the direction T of travel of the recording medium. The first return path section 40 connects the first shield 16A and part of the main pole 15 away from the medium facing surface 100 to each other so that a first space S1 is defined by the main pole 15, the gap part 17 (the gap layer 19), the first shield 16A, and the first return path section 40 (the magnetic layers 41 to 44).

The magnetic layer 42 magnetically couples the first shield 16A and the magnetic layer 44 to each other. The magnetic layer 42 has the front end face located in the medium facing surface 100 at a position forward of the end face 16Aa of the first shield 16A in the direction T of travel of the recording medium. The magnetic layer 42 further has the top surface, and the first and second connecting surfaces that connect the front end face and the top surface to each other. Part of the insulating layer 66 is interposed between the medium facing surface 100 and the first and second connecting surfaces of the magnetic layer 42. In the main cross section, the magnetic layer 44 is greater than the first shield 16A in length in the direction perpendicular to the medium facing surface 100. In the main cross section, the magnetic layer 42 is greater than the first shield 16A and smaller than the magnetic layer 44 in length in the direction perpendicular to the medium facing surface 100.

The magnetic layer 44 is not exposed in the medium facing surface 100. The magnetic layer 44 has an end face facing toward the medium facing surface 100 and located at a distance from the medium facing surface 100. Part of the insulating layer 68 is interposed between the medium facing surface 100 and the aforementioned end face of the magnetic layer 44.

The first coil 20 and the second coil 10 will now be described in detail with reference to FIG. 1 and FIG. 3 to FIG. 5. FIG. 3 is a plan view showing the second coil 10. The second coil 10 is located backward of the main pole 15 in the direction T of travel of the recording medium, and is wound around a part of the second return path section 30. The second coil 10 includes a plurality of second coil elements that extend to pass through the second space S2. Note that the coil elements refer to a part of the coil winding. In the present embodiment, in particular, the second coil 10 is wound approximately four turns around the magnetic layer 33 constituting a part of the second return path section 30, and includes four second coil elements 10A, 10B, 10C, and 10D. No part of the second coil 10 other than the second coil elements 10A, 10B, 10C, and 10D exists in the second space S2. The second coil elements 10A, 10B, 10C, and 10D align in this order in the direction perpendicular to the medium facing surface 100, the coil element 10A being closest to the medium facing surface 100. The second coil 10 has a coil connection part 10E electrically connected to the first coil 20.

As shown in FIG. 1 and FIG. 3, the magnetic layer 32 is interposed between the medium facing surface 100 and the second coil elements 10A to 10D. The magnetic layers 33, 35, and 36 are located farther from the medium facing surface 100 than are the second coil elements 10A to 10D. The magnetic layers 33, 35, and 36 correspond to the "core part" according to the present invention. In the present embodiment, the core part (the magnetic layers 33, 35, and 36) of the second return path section 30 are connected to a part of the main pole 15 away from the medium facing surface 100.

The first coil 20 is located forward of the main pole 15 in the direction T of travel of the recording medium, and is wound around a part of the first return path section 40. The first coil 20 includes at least one first coil element that extends to pass through the first space S1. In the present embodiment, the first coil 20 includes the first layer 21 and the second layer 22.

FIG. 4 is a plan view showing the first layer 21 of the first coil 20. The first layer 21 is wound one turn around the magnetic layer 41 which constitutes a part of the first return path section 40. The first layer 21 includes one first coil element 21A extending to pass between the first shield 16A and the magnetic layer 41, in particular, within the first space S1. The first layer 21 has a coil connection part 21S electrically connected to the coil connection part 10E of the second coil 10, and a coil connection part 21E electrically connected to the second layer 22. The coil connection part 21S is electrically connected to the coil connection part 10E via a connection layer of columnar shape (not shown) that penetrates a plurality of layers interposed between the first layer 21 and the second coil 10. The connection layer is made of a conductive material such as copper.

FIG. 5 is a plan view showing the second layer 22 of the first coil 20. The second layer 22 is wound approximately one turn around the magnetic layer 43 which constitutes a part of the first return path section 40. The second layer 22 includes a first coil element 22A extending to pass between the magnetic layer 42 and the magnetic layer 43, in particular, within the first space S1. The second layer 22 has a coil connection part 22S penetrating the insulating layer 62 and electrically connected to the coil connection part 21E of the first layer 21. No part of the first coil 20 other than the first coil elements 21A and 22A exists in the first space S1. In the example shown in FIG. 3 to FIG. 5, the first coil 20 and the second coil 10 are connected in series.

The total number of turns of the first coil 20 (the sum of the number of turns of the first layer 21 and the number of turns of the second layer 22) is approximately two, and the number of the first coil elements passing through the first space S1 is two. The number of turns of the second coil 10 is approximately four, and the number of the second coil elements passing through the second space S2 is four. As such, in the present embodiment, the first coil elements are smaller in number than the second coil elements.

Figure 6:
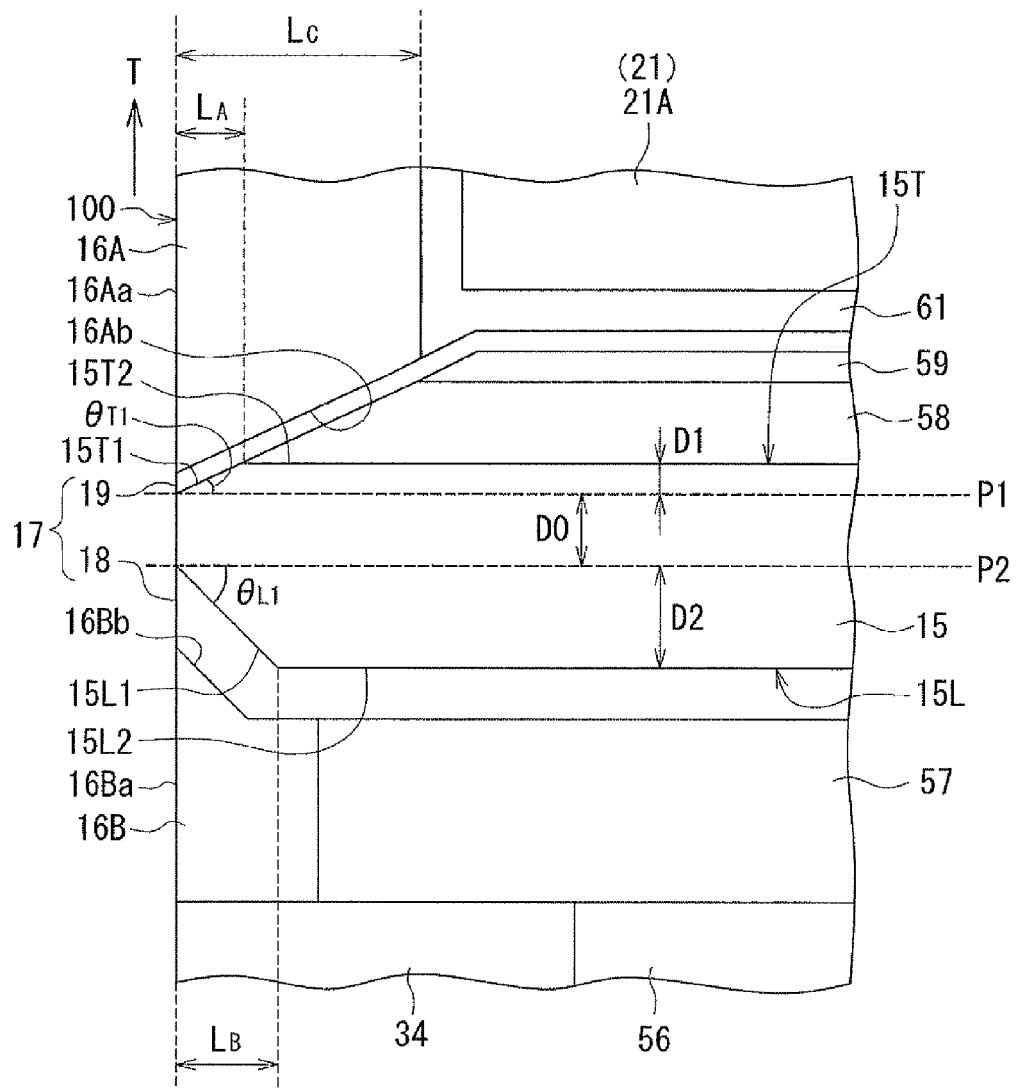
FIG. 6 is a cross-sectional view showing a part of a main pole in the vicinity of the medium facing surface in the magnetic head according to the first embodiment of the invention.

The shape of the main pole 15 will now be described in detail with reference to FIG. 3 to FIG. 6. FIG. 6 is a cross-sectional view showing a part of the main pole 15 in the vicinity of the medium facing surface 100. Note that FIG. 6 shows a cross section perpendicular to the medium facing surface 100 and the top surface 1a of the substrate 1, or the main cross section, in particular. As shown in FIG. 3 to FIG. 5, the main pole 15 includes a track width defining portion 15A and a wide portion 15B. The track width defining portion 15A has an end face located in the medium facing surface 100, and an end opposite to the end face. The wide portion 15B is connected to the end of the track width defining portion 15A. As shown in FIG. 6, the main pole 15 has: the top surface 15T which is the surface located at the forward end in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 100. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 100, then becoming constant. Here, the length of the track width defining portion 15A in the direction perpendicular to the medium facing surface 100 will be referred to as the neck height. The neck height falls within the range of 0 to 0.3 μm, for example. A zero neck height means that no track width defining portion 15A exists and an end face of the wide portion 15B is thus located in the medium facing surface 100.

The top surface 15T includes a first portion 15T1 and a second portion 15T2 that are arranged in this order of increasing distance from the medium facing surface 100. The first portion 15T1 has a first end located in the medium facing surface 100 and a second end opposite to the first end. The second portion 15T2 is connected to the second end of the first portion 15T1.

The bottom end 15L includes a third portion 15L1 and a fourth portion 15L2 that are arranged in this order of increasing distance from the medium facing surface 100. The third portion 15L1 has a first end located in the medium facing surface 100 and a second end opposite to the first end. The third portion 15L1 may be an edge formed by two intersecting planes, or may be a plane connecting two planes to each other. The fourth portion 15L2 is a plane connected to the second end of the third portion 15L1.

Here, as shown in FIG. 6, assume a first virtual plane P1 and a second virtual plane P2. The first virtual plane P1 passes through the first end of the first portion 15T1 and is perpendicular to the medium facing surface 100 and to the direction T of travel of the recording medium. The second virtual plane P2 passes through the first end of the third portion 15L1 and is perpendicular to the medium facing surface 100 and to the direction T of travel of the recording medium. The first portion 15T1 is inclined relative to the first virtual plane P1 and the medium facing surface 100 such that the second end of the first portion 15T1 is located forward of the first virtual plane P1 in the direction T of travel of the recording medium. The third portion 15L1 is inclined relative to the second virtual plane P2 and the medium facing surface 100 such that the second end of the third portion 15L1 is located backward of the second virtual plane P2 in the direction T of travel of the recording medium.

As described previously, the first shield 16A has the first slope 16Ab serving as the bottom surface. The first slope 16Ab includes a portion that is opposed to the first portion 15T1 with the first gap layer 19 of the gap part 17 interposed therebetween. The first slope 16Ab is inclined relative to the first virtual plane P1 and the medium facing surface 100. The minimum distance between the first slope 16Ab and the first portion 15T1 is also the minimum distance between the first shield 16A and the main pole 15. This distance is smaller than the minimum distance between the first coil element 21A and the main pole 15.

The second shield 16B has a top surface including the second slope 16Bb and a flat portion. The second slope 16Bb is opposed to the third portion 15L1 with the second gap layer 18 of the gap part 17 interposed therebetween. The second slope 16Bb is inclined relative to the second virtual plane P2 and the medium facing surface 100. The flat portion is contiguous with the second slope 16Bb and is located farther from the medium facing surface 100 than is the second slope 16Bb. The top surfaces of the flat portion and the nonmagnetic layer 57 are opposed to the fourth portion 15L2 with the second gap layer 18 of the gap part 17 interposed therebetween. The minimum distance between the top surface of the second shield 16B and the third portion 15L1 is also the minimum distance between the second shield 16B and the main pole 15. This distance is smaller than the minimum distance between the main pole 15 and the second coil elements 10A, 10B, 10C, and 10D.

Here, as shown in FIG. 6, the length of the first portion 15T1 in the direction perpendicular to the medium facing surface 100 will be represented by the symbol $L_A$, the length of the third portion 15L1 in the direction perpendicular to the medium facing surface 100 will be represented by the symbol $L_B$, and the length of the first slope 16Ab in the direction perpendicular to the medium facing surface 100 will be represented by the symbol $L_C$. The length $L_A$ is smaller than the lengths $L_B$ and $L_C$. The length $L_A$ falls within the range of 0.05 to 0.15 μm, for example. The length $L_B$ falls within the range of 0.2 to 1.2 μm, for example. The length $L_C$ falls within the range of 0.2 to 0.6 μm, for example.

The neck height, i.e., the distance from the medium facing surface 100 to the boundary between the track width defining portion 15A and the wide portion 15B may be equal to or different from the length $L_A$ of the first portion 15T1 or the length $L_B$ of the third portion 15L1.

As shown in FIG. 6, the angle of inclination of the first portion 15T1 relative to the first virtual plane P1 will be represented by the symbol $\theta_{T1}$, and the angle of inclination of the third portion 15L1 relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

The second portion 15T2 and the fourth portion 15L2 extend in a direction substantially perpendicular to the medium facing surface 100. As shown in FIG. 6, the thickness of the main pole 15 in the medium facing surface 100, i.e., the distance between the first virtual plane P1 and the second virtual plane P2, will be represented by the symbol D0. The distance between the second portion 15T2 and the first virtual plane P1 will be represented by the symbol D1. The distance between the fourth portion 15L2 and the second virtual plane P2 will be represented by the symbol D2.

The distance D2 is greater than the distance D1. The distance D0 falls within the range of 0.05 to 0.1 μm, for example. The distance D1 falls within the range of 0.02 to 0.1 μm, for example. The distance D2 falls within the range of 0.2 to 0.8 μm, for example.

The end face of the main pole 15 located in the medium facing surface 100 has a first side adjacent to the first gap layer 19, a second side connected to a first end of the first side, and a third side connected to a second end of the first side. The first side defines the track width. The position of an end of a record bit to be recorded on the recording medium depends on the position of the first side. The end face of the main pole 15 located in the medium facing surface 100 decreases in width in the track width direction TW with increasing proximity to the bottom end 15L of the main pole 15, that is, with increasing proximity to the second virtual plane P2. Each of the second side and the third side forms an angle of, for example, 7° to 17°, or preferably 10° to 15°, relative to a direction perpendicular to the second virtual plane P2. The first side has a length in the range of 0.05 to 0.20 for example.

The function and effects of the magnetic head according to the present embodiment will now be described. The magnetic head writes data on the recording medium by using the write head section 9 and reads data stored on the recording medium by using the read head section 8. In the write head section 9, the first coil 20 and the second coil 10 produce magnetic fields corresponding to data to be written on the recording medium. A magnetic flux corresponding to the magnetic field produced by the first coil 20 passes through the first return path section 40 and the main pole 15. A magnetic flux corresponding to the magnetic field produced by the second coil 10 passes through the second return path section 30 and the main pole 15. Consequently, the main pole 15 allows the magnetic flux corresponding to the magnetic field produced by the first coil 20 and the magnetic flux corresponding to the magnetic field produced by the second coil 10 to pass.

The first coil 20 and the second coil 10 may be connected in series or in parallel. In either case, the first coil 20 and the second coil 10 are connected such that the magnetic flux corresponding to the magnetic field produced by the first coil 20 and the magnetic flux corresponding to the magnetic field produced by the second coil 10 flow in the same direction through the main pole 15.

The main pole 15 allows the magnetic fluxes corresponding to the magnetic fields produced by the first coil 20 and the second coil 10 to pass as mentioned above, and produces a write magnetic field for writing data on the recording medium by means of the perpendicular magnetic recording system.

The shields 16A, 16B, 16C and 16D capture a disturbance magnetic field applied to the magnetic head from the outside thereof. This makes it possible to prevent erroneous writing on the recording medium induced by the disturbance magnetic field intensively captured into the main pole 15. The shields 16A, 16B, 16C and 16D also function to capture a magnetic flux that is produced from the end face of the main pole 15 and spreads in directions other than the direction perpendicular to the plane of the recording medium, and to thereby prevent the magnetic flux from reaching the recording medium.

Figure 7:
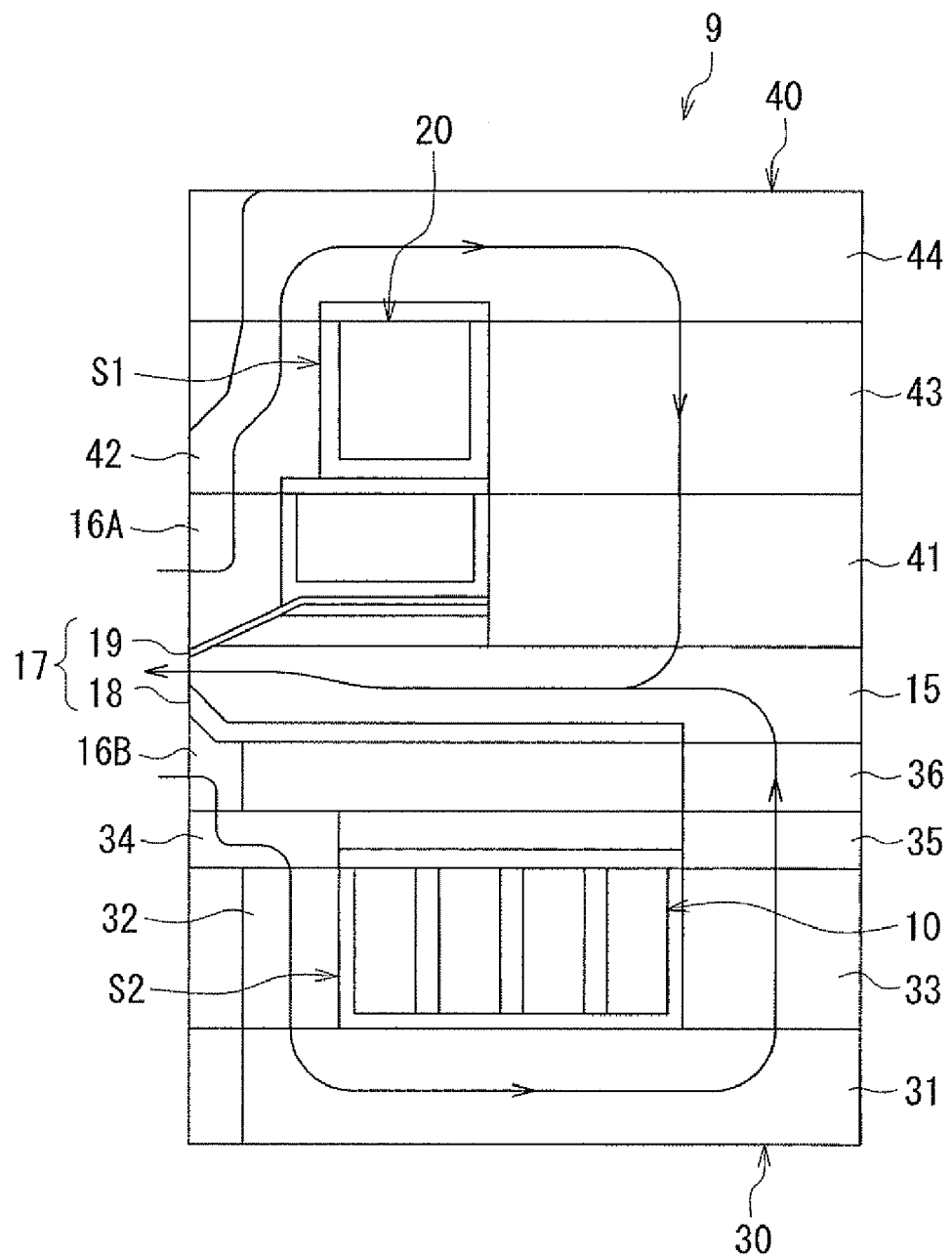
FIG. 7 is an explanatory diagram showing the flow of magnetic flux in the magnetic head according to the first embodiment of the invention.

Furthermore, the shields 16A, 16B, 16C and 16D, the first return path section 40, and the second return path section 30 function to allow a magnetic flux that has been produced from the end face of the main pole 15 and has magnetized the recording medium to flow back. Reference is now made to FIG. 7 to specifically describe the flow of magnetic flux in the magnetic head according to the present embodiment. FIG. 7 is an explanatory diagram showing the flow of magnetic flux in the magnetic head according to the present embodiment. In FIG. 7, the lines with arrows indicate the flow of magnetic flux. As shown in FIG. 7, a part of the magnetic flux that has been produced from the end face of the main pole 15 and has magnetized the recording medium flows back to the main pole 15 through the first shield 16A and the first return path section 40. Furthermore, as shown in FIG. 7, another part of the magnetic flux that has been produced from the end face of the main pole 15 and has magnetized the recording medium flows back to the main pole 15 through the second shield 16B and the second return path section 30.

In the medium facing surface 100, the end faces 16Aa, 16Ba, 16Ca, and 16Da of the shields 16A, 16B, 16C, and 16D are arranged to wrap around the end face of the main pole 15. The present embodiment thus makes it possible that, in regions both backward and forward of the end face of the main pole 15 in the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first shield 16A and the second shield 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the shields 16A, 16B, 16C, and 16D serve to increase the recording density.

Furthermore, as shown in FIG. 2, the present embodiment is configured so that in the medium facing surface 100, the distance between the first and second side parts of the main pole 15 in the track width direction TW, i.e., the width of the end face of the main pole 15, decreases with increasing proximity to the second virtual plane. According to the present embodiment, this feature also serves to prevent adjacent track erasure induced by a skew.

The present embodiment is also configured so that in the medium facing surface 100, the distance between the first and second sidewalls of the side shields 16C and 16D in the track width direction TW decreases with increasing proximity to the second virtual plane, as does the distance between the first and second side parts of the main pole 15. The present embodiment thus allows both the distance between the first side part and the first sidewall and the distance between the second side part and the second sidewall to be small and constant in the medium facing surface 100. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The shields 16A to 16D cannot capture much magnetic flux if the shields 16A to 16D are not magnetically connected with any magnetic layer having a sufficiently large volume enough to accommodate the magnetic flux captured by the shields 16A to 16D. In the present embodiment, there are provided the first return path section 40 (the magnetic layers 41 to 44) which magnetically couples the first shield 16A and the main pole 15 to each other, and the second return path section 30 (the magnetic layers 31 to 36) which magnetically couples the second shield 16B and the main pole 15 to each other. Such a configuration allows the magnetic flux captured by the shields 16A to 16D to flow into the main pole 15 by way of the first return path section 40 and the second return path section 30 (see FIG. 7). In the present embodiment, the first return path section 40, the second return path section 30 and the main pole 15, which are magnetic layers large in volume, are magnetically connected to the shields 16A to 16D. This allows the shields 16A to 16D to capture much magnetic flux, so that the above-described effect of the shields 16A to 16D can be exerted effectively.

Furthermore, in the present embodiment, the second shield 16B is provided in addition to the second return path section 30. In the main cross section, the magnetic layer 31, which is located farthest from the main pole 15 among the magnetic layers that constitute the second return path section 30, is greater than the second shield 16B in length in the direction perpendicular to the medium facing surface 100. The second coil 10 passes through the space S2. Such a structure is more advantageous than a structure where the magnetic layer 31 also serves as the second shield. More specifically, according to the present embodiment, it is possible to bring the second shield 16B and the main pole 15 into sufficiently close proximity to each other. This enhances the function of the second shield 16B.

Now, a description will be made as to the role of the magnetic layers 32 and 34. First, suppose a case where the magnetic layers 32 and 34 are not provided and thus the second shield 16B and the magnetic layer 31 are not magnetically coupled to each other. In this case, the magnetic flux that has been captured by the second shield 16B or the side shields 16C and 16D and directed downward cannot flow toward the magnetic layer 31, and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 100. This may cause adjacent track erasure. In contrast to this, if the second shield 16B and the magnetic layer 31 are magnetically coupled to each other by the magnetic layers 32 and 34, the magnetic flux captured by the side shields 16C and 16D is divided to flow upward and downward, and the magnetic flux captured by the second shield 16B is mainly directed downward. This can prevent the adjacent track erasure that may be caused by part of the magnetic flux captured by the second shield 16B or the side shields 16C and 16D being leaked out of the medium facing surface 100.

The above description relating to the magnetic layers 32 and 34 also applies to the magnetic layer 42. More specifically, if the first shield 16A and the magnetic layer 44 are magnetically coupled to each other by the magnetic layer 42, the magnetic flux captured by the side shields 16C and 16D is divided into an upward flux and a downward flux, and the magnetic flux captured by the first shield 16A flows mainly upward. This can prevent the adjacent track erasure that may be caused by part of the magnetic flux captured by the first shield 16A or the side shields 16C and 16D being leaked out of the medium facing surface 100.

If the second shield 16B is excessively long in the direction perpendicular to the medium facing surface 100 in the main cross section, flux leakage from the main pole 15 to the second shield 16B increases and the main pole 15 thus becomes unable to direct much magnetic flux to the medium facing surface 100. It is therefore necessary that the second shield 16B is not excessively long in the direction perpendicular to the medium facing surface 100 in the main cross section. In the main cross section, if the length of each of the magnetic layers 32 and 34 in the direction perpendicular to the medium facing surface 100 is equal to or smaller than that of the second shield 16B, the magnetic layers 32 and 34 cannot direct much magnetic flux from the second shield 16B to the magnetic layer 31. In the present embodiment, in contrast, the magnetic layers 32 and 34 are configured so that in the main cross section, the length of each of the magnetic layers 32 and 34 in the direction perpendicular to the medium facing surface 100 is greater than that of the second shield 16B and smaller than that of the magnetic layer 31. Consequently, the present embodiment allows the magnetic layers 32 and 34 to direct much magnetic flux from the second shield 16B to the magnetic layer 31.

Likewise, in the present embodiment, the magnetic layer 42 is configured so that in the main cross section, the length of the magnetic layer 42 in the direction perpendicular to the medium facing surface 100 is greater than that of the first shield 16A and smaller than that of the magnetic layer 44. Consequently, the present embodiment allows the magnetic layer 42 to direct much magnetic flux from the first shield 16A to the magnetic layer 44.

The magnetic layer 32 is disposed between the medium facing surface 100 and the second coil 10. If the end face of the magnetic layer 32 is exposed over a large area in the medium facing surface 100, heat that is generated by the second coil 10 may cause the magnetic layer 32 to expand and thereby cause protrusion of the end face of the magnetic layer 32, which is part of the medium facing surface 100.

In the present embodiment, the insulating layer 54 which is harder than the magnetic layer 32 is provided between the magnetic layer 32 and the medium facing surface 100. The insulating layer 54 exists over a larger area than does the magnetic layer 32. The insulating layer 54 therefore functions to prevent changes in the position of the magnetic layer 32 induced by the heat generated by the second coil 10. Thus, the present embodiment makes it possible to prevent part of the medium facing surface 100 from protruding due to the heat generated by the second coil 10.

The position of an end of a record bit to be recorded on the recording medium depends on the position of an end of the end face of the main pole 15 located in the medium facing surface 100, the end being located forward in the direction T of travel of the recording medium. Accordingly, in order to define the position of the end of the record bit accurately, it is particularly important for the first shield 16A, of the first and second shields 16A and 16B, to be capable of capturing as much magnetic flux as possible. In the present embodiment, the first shield 16A is greater in volume than the second shield 16B and is thus capable of capturing more magnetic flux than the second shield 16B.

Additionally, as the frequency of the recording signal is increased in order to increase the recording density, the magnetic head is required to be improved in the rate of change in the direction of the magnetic flux produced from the end face of the main pole 15. As mentioned above, the position of the end of the record bit depends on the position of an end of the end face of the main pole 15 located in the medium facing surface 100, the end being located forward in the direction T of travel of the recording medium. To increase the recording density, it is therefore required to improve the rate of change in the direction of the magnetic flux passing through the first shield 16A as well as to improve the rate of change in the direction of the magnetic flux produced from the end face of the main pole 15. To meet these requirements, it is effective to reduce the length of a magnetic path that passes through the first shield 16A and the main pole 15. In the present embodiment, there is provided the first return path section 40 for connecting the main pole 15 and the first shield 16A to each other. This allows the length of the aforementioned magnetic path to be shorter than in the case where the first return path section 40 is not provided.

Furthermore, in the present embodiment, the first coil elements (21A and 22A) passing through the first space S1 are smaller in number than the second coil elements (10A, 10B, 10C and 10D) passing through the second space S2. According to the present embodiment, reducing the number of the first coil elements allows a further reduction in length of the magnetic path that passes through the first shield 16A and the main pole 15. This makes it possible to improve both the rate of change in the direction of the magnetic flux produced from the end face of the main pole 15 and the rate of change in the direction of the magnetic flux passing through the first shield 16A, thereby allowing the enhancement of the recording density.

However, simply reducing the number of the first coil elements would decrease the magnetomotive force produced by the first coil 20 and thereby hinder the main pole 15 from producing a write magnetic field of sufficient magnitude. In contrast, according to the present embodiment, the number of the second coil elements can be increased to enhance the magnetomotive force produced by the second coil 10. More specifically, the aforementioned requirement for the present embodiment that the first coil elements be smaller in number than the second coil elements is equivalent to that the second coil elements are greater in number than the first coil elements. Accordingly, in the present embodiment, the number of the second coil elements can be increased without being limited by the number of the first coil elements. By increasing the number of the second coil elements in this manner, it is possible to enhance the magnetomotive force produced by the second coil 10. The present embodiment thus allows the main pole 15 to produce a write magnetic field of sufficient magnitude even when the number of the first coil elements is reduced. Consequently, according to the present embodiment, it is possible to allow the main pole 15 to produce a write magnetic field of sufficient magnitude while reducing the length of the magnetic path that passes through the first shield 16A and the main pole 15.

In the present embodiment, in particular, the number of turns of the first coil 20 is approximately two, the number of the first coil elements is two, the number of turns of the second coil 10 is approximately four, and the number of the second coil elements is four. Here, consider a magnetic head of a comparative example configured so that the number of turns of the first coil 20 and the number of turns of the second coil 10 are both three, and the first coil elements and the second coil elements are both three in number. The remainder of configuration of the magnetic head of the comparative example is the same as that of the magnetic head according to the present embodiment. The total magnetomotive force produced by the first and second coils 20 and 10 of the present embodiment is almost equal to the total magnetomotive force produced by the first and second coils 20 and 10 of the magnetic head of the comparative example. On the other hand, the present embodiment allows the magnetic path passing through the first shield 16A and the main pole 15 to be shorter in length because the number of the first coil elements is smaller than that in the magnetic head of the comparative example. Thus, when compared with the magnetic head of the comparative example, the present embodiment allows a reduction in length of the magnetic path passing through the first shield 16A and the main pole 15, while allowing the magnitude of the write magnetic field produced by the main pole 15 to be equivalent to that in the magnetic head of the comparative example.

In the present embodiment, as shown in FIG. 1, a first interface S10 is formed between the first return path section 40 (the magnetic layer 41) and the main pole 15, and a second interface S20 is formed between the second return path section 30 (the magnetic layer 36) and the main pole 15. The first interface S10 has a first end E1 that is closest to the medium facing surface 100. The second interface S20 has a second end E2 that is closest to the medium facing surface 100. The first end E1 is located closer to the medium facing surface 100 than is the second end E2. This also serves to reduce the length of the magnetic path passing through the first shield 16A and the main pole 15.

Now, a detailed description will be given of the features of the relationship between the main pole 15 and the first shield 16A and the effects resulting therefrom. In the present embodiment, as shown in FIG. 6, the top surface 15T of the main pole 15 includes the first portion 15T1 inclined relative to the first virtual plane P1 and the medium facing surface 100, while the bottom end 15L of the main pole 15 includes the third portion 15L1 inclined relative to the second virtual plane P2 and the medium facing surface 100. The main pole 15 of such a shape allows the prevention of adjacent track erasure induced by a skew because the main pole 15 has a small thickness in the medium facing surface 100. On the other hand, since a part of the main pole 15 away from the medium facing surface 100 has a large thickness, it is possible for the main pole 15 to direct much magnetic flux to the medium facing surface 100, and this makes it possible to improve write characteristics such as the overwrite property.

In the present embodiment, the length $L_A$ of the first portion 15T1 in the direction perpendicular to the medium facing surface 100 is smaller than the length $L_C$ of the first slope 16Ab in the direction perpendicular to the medium facing surface 100. If the length $L_A$ is equal to the length $L_C$ shown in FIG. 6, the first portion 15T1 and the first slope 16Ab are opposed to each other over a large area with a small spacing therebetween. This leads to a problem that a large amount of magnetic flux leaks from the main pole 15 to the first shield 16A, and causes degradation in write characteristics such as the overwrite property. To prevent this, the length $L_C$ may be reduced to make the relationship between the lengths $L_A$ and $L_C$ opposite to that shown in FIG. 6. This, however, reduces the volume of the first shield 16A which is located forward of the main pole 15 in the direction T of travel of the recording medium, and thereby compromises the function of the first shield 16A. More specifically, a reduction in the volume of the first shield 16A is likely to cause magnetic flux saturation in the first shield 16A. This in turn leads to magnetic flux leakage from the first shield 16A to the medium facing surface 100, raising a problem that the magnetic flux leakage may result in accidental erasure of data stored on the recording medium.

In the present embodiment, the length $L_A$ is made smaller than the length $L_C$ to allow the first portion 15T1 and the first slope 16Ab to be opposed to each other over a smaller area. This makes it possible to prevent magnetic flux leakage from the main pole 15 to the first shield 16A without compromising the function of the first shield 16A. However, this causes the distance D1 between the second portion 15T2 and the first virtual plane P1 to be small, and cannot therefore serve to sufficiently increase the thickness of a portion of the main pole 15 located away from the medium facing surface 100.

To cope with this, in the present embodiment, the distance D2 between the fourth portion 15L2 and the second virtual plane P2 is made greater than the distance D1 between the second portion 15T2 and the first virtual plane P1, and the length $L_A$ of the first portion 15T1 is made smaller than the length $L_B$ of the third portion 15L1. This makes it possible to reduce the thickness of the main pole 15 in the medium facing surface 100 and to sufficiently increase the thickness of a portion of the main pole 15 that is located farther from the medium facing surface 100 than is the third portion 15L1, while preventing magnetic flux leakage from the main pole 15 to the first shield 16A as described above. According to the present embodiment, it is thereby possible to prevent the skew-induced problems and provide improved write characteristics.

According to the present embodiment, the above-described features of the relationship between the main pole 15 and the first shield 16A make it possible to prevent the skew-induced problems and provide improved write characteristics without compromising the function of the first shield 16A.

Second Embodiment

Figure 8:
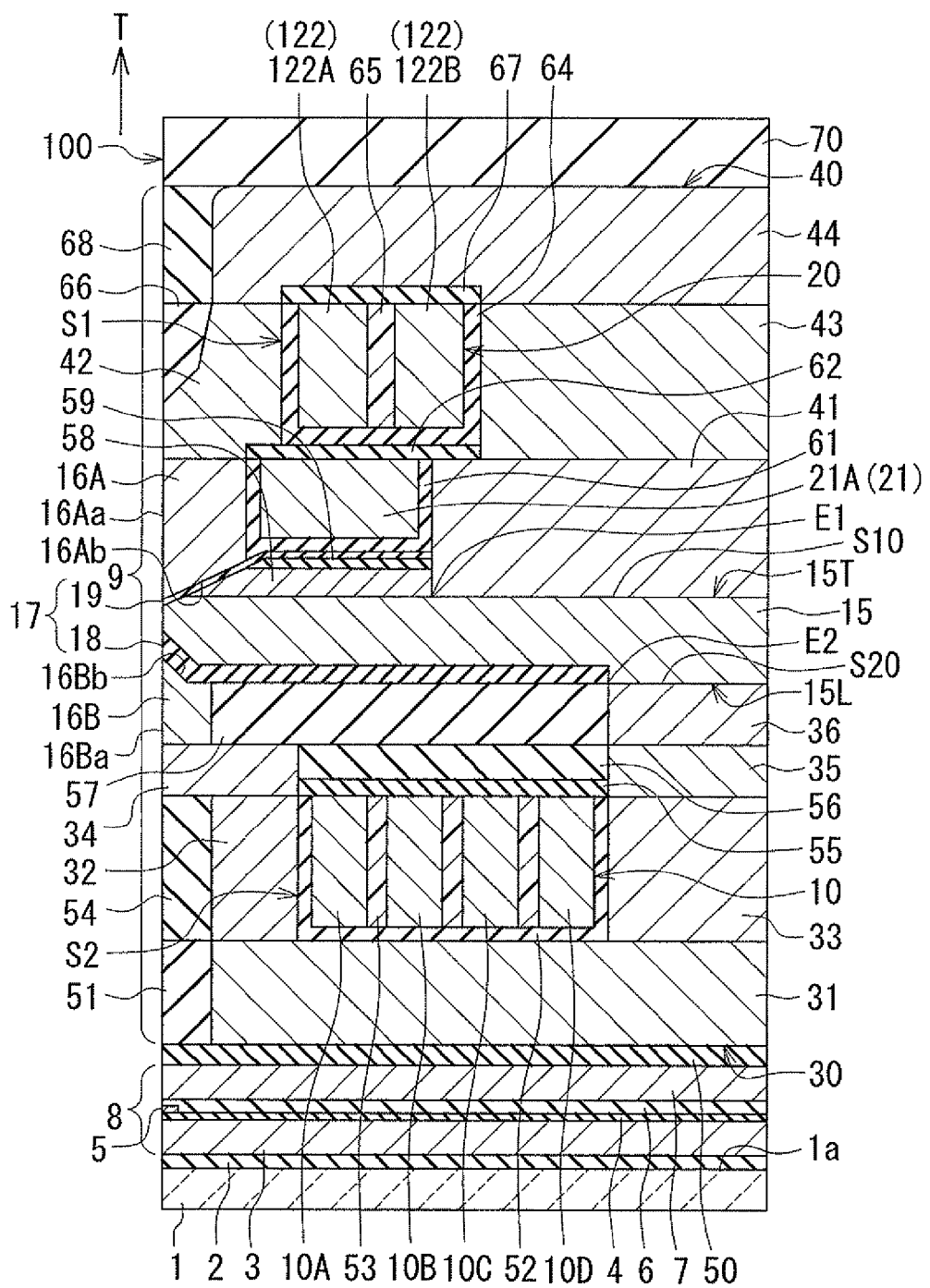
FIG. 8 is a cross-sectional view of a magnetic head according to a second embodiment of the invention.
Figure 9:
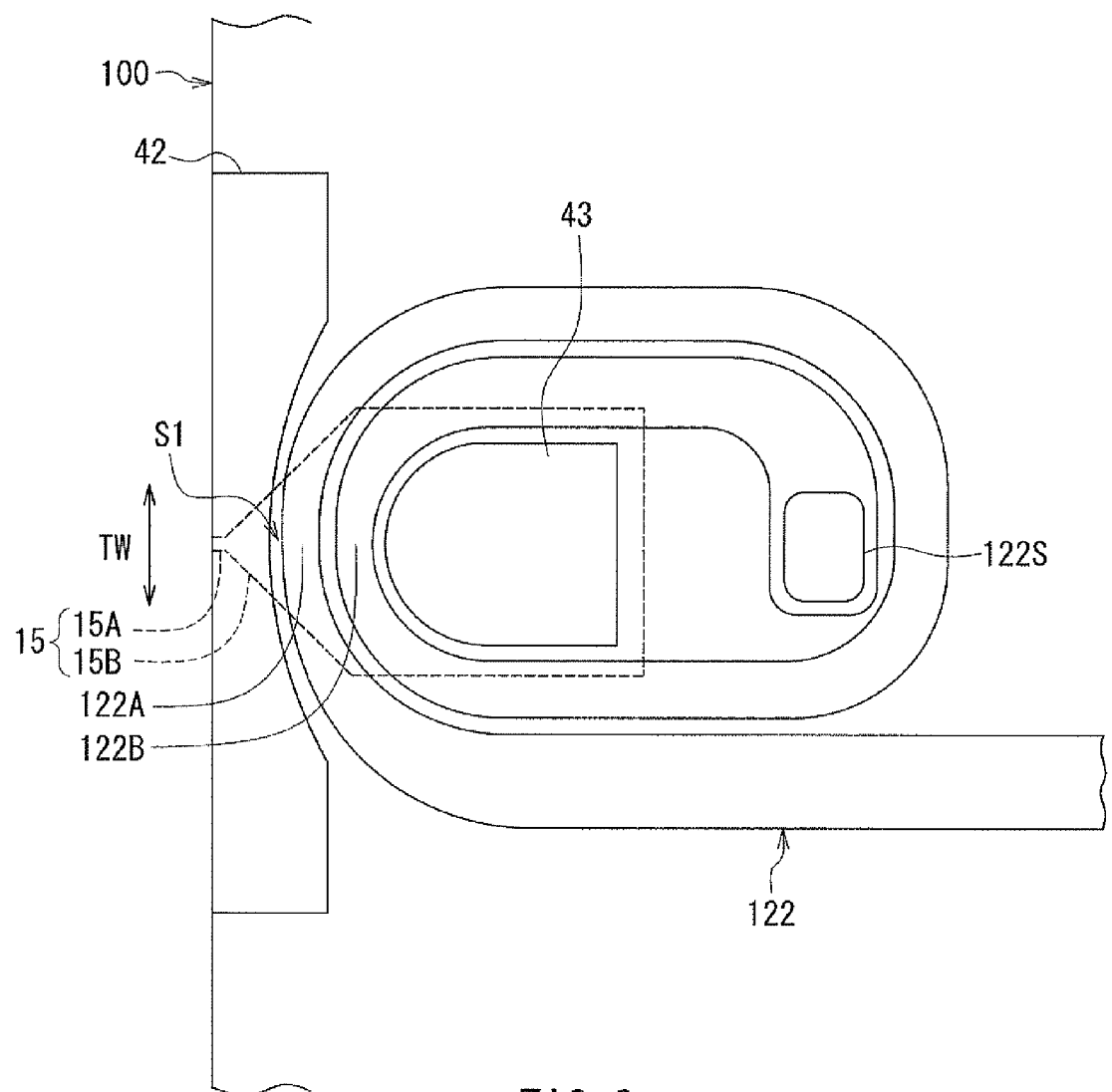
FIG. 9 is a plan view showing a second layer of a first coil of the magnetic head according to the second embodiment of the invention.

A magnetic head according to a second embodiment of the invention will now be described with reference to FIG. 8 and FIG. 9. FIG. 8 is a cross-sectional view of the magnetic head according to the present embodiment. Note that FIG. 8 shows a cross section perpendicular to the medium facing surface and the top surface of the substrate, or the main cross section, in particular. FIG. 9 is a plan view showing a second layer of a first coil of the magnetic head according to the present embodiment.

The configuration of the magnetic head according to the present embodiment is different from that of the magnetic head according to the first embodiment in the following respects. In the magnetic head according to the present embodiment, the first coil 20 includes a second layer 122 instead of the second layer 22 of the first embodiment. As shown in FIG. 9, the second layer 122 is wound approximately two turns around the magnetic layer 43 which constitutes a part of the first return path section 40. The magnetic head according to the present embodiment further includes an insulating layer 65 made of an insulating material and disposed in the space between adjacent turns of the second layer 122. The top surfaces of the second layer 122, the magnetic layers 42 and 43, the insulating film 64, and the insulating layers 65 and 66 are even with each other. The insulating layer 65 is made of photoresist, for example.

The second layer 122 will now be described in more detail with reference to FIG. 9. As shown in FIG. 9, the second layer 122 includes two first coil elements 122A and 122B extending to pass between the magnetic layer 42 and the magnetic layer 43, in particular, within the first space S1. The first coil elements 122A and 122B align in this order in the direction perpendicular to the medium facing surface 100, the coil element 122A being closer to the medium facing surface 100. The second layer 122 has a coil connection part 122S penetrating the insulating layer 62 and the insulating film 64 and electrically connected to the coil connection part 21E (see FIG. 4) of the first layer 21. No part of the first coil 20 other than the first coil elements 21A, 122A, and 122B exists in the first space S1. In the example shown in FIG. 3, FIG. 4 and FIG. 9, the first coil 20 and the second coil 10 are connected in series.

In the present embodiment, the total number of turns of the first coil 20 (the sum of the number of turns of the first layer 21 and the number of turns of the second layer 122) is approximately three, and the number of the first coil elements passing through the first space S1 is three. As has been described in relation to the first embodiment, the number of turns of the second coil 10 is approximately four, and the number of the second coil elements passing through the second space S2 is four. As such, in the present embodiment, the first coil elements are smaller in number than the second coil elements.

The remainder of configuration, function and effects of the present embodiment are similar to those of the first embodiment.

Third Embodiment

Figure 10:
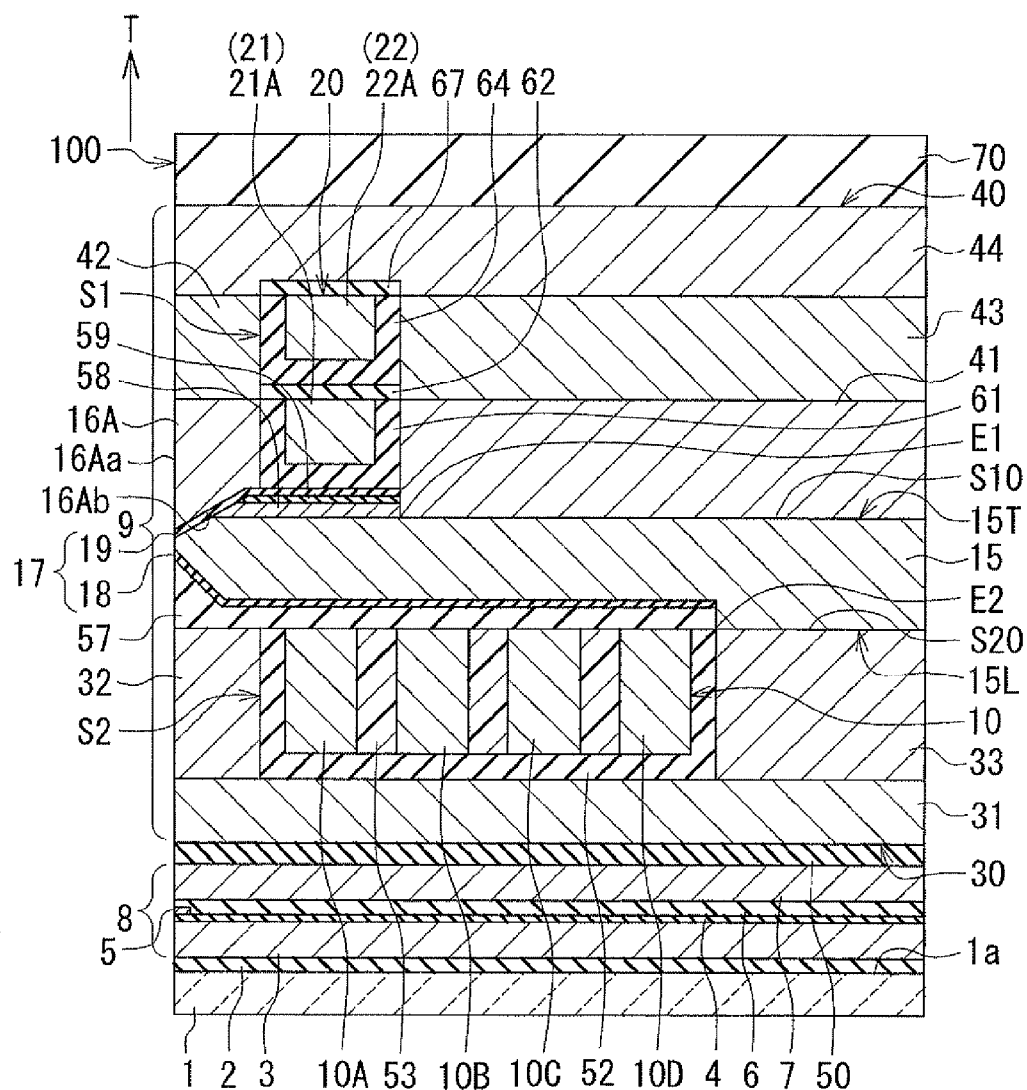
FIG. 10 is a cross-sectional view of a magnetic head according to a third embodiment of the invention.

A magnetic head according to a third embodiment of the invention will now be described with reference to FIG. 10. FIG. 10 is a cross-sectional view of the magnetic head according to the present embodiment. Note that FIG. 10 shows a cross section perpendicular to the medium facing surface and the top surface of the substrate, or the main cross section, in particular.

The configuration of the magnetic head according to the present embodiment is different from that of the magnetic head according to the first embodiment in the following respects. The magnetic head according to the present embodiment is without the second shield 16B, the magnetic layers 34 to 36 and the insulating layers 55 and 56. The nonmagnetic layer 57 is disposed over the top surfaces of the second coil 10, the magnetic layer 32, the insulating film 52, and the insulating layers 53 and 54. Each of the magnetic layers 31 and 32 has an end face that is located in the medium facing surface 100 at a position backward of the end face of the main pole 15 in the direction T of travel of the recording medium. The top surface of the magnetic layer 33 is in contact with the bottom end 15L of the main pole 15. The magnetic layer 42 does not have the first and second connecting surfaces. The top surface of the magnetic layer 42 extends to the medium facing surface 100 and is connected to the front end face of the magnetic layer 42. The magnetic layer 44 has an end face located in the medium facing surface 100.

In the present embodiment, the second return path section 30 has an end face located in the medium facing surface 100 at a position backward of the end face of the main pole 15 in the direction T of travel of the recording medium. The aforementioned end face of the second return path section 30 consists of the end face of the magnetic layer 31 and the end face of the magnetic layer 32. The aforementioned end face of the second return path section 30 (the end faces of the magnetic layers 31 and 32) captures a disturbance magnetic field applied to the magnetic head from the outside thereof. A part of the magnetic flux that has been produced from the end face of the main pole 15 and has magnetized the recording medium flows back to the main pole 15 through the aforementioned end face of the second return path section 30.

The first coil 20 of the present embodiment may include the second layer 122 which has been described in relation to the second embodiment, instead of the second layer 22. The remainder of configuration, function and effects of the present embodiment are similar to those of the first or second embodiment except for those relating to the second shield 16B.

Fourth Embodiment

Figure 11:
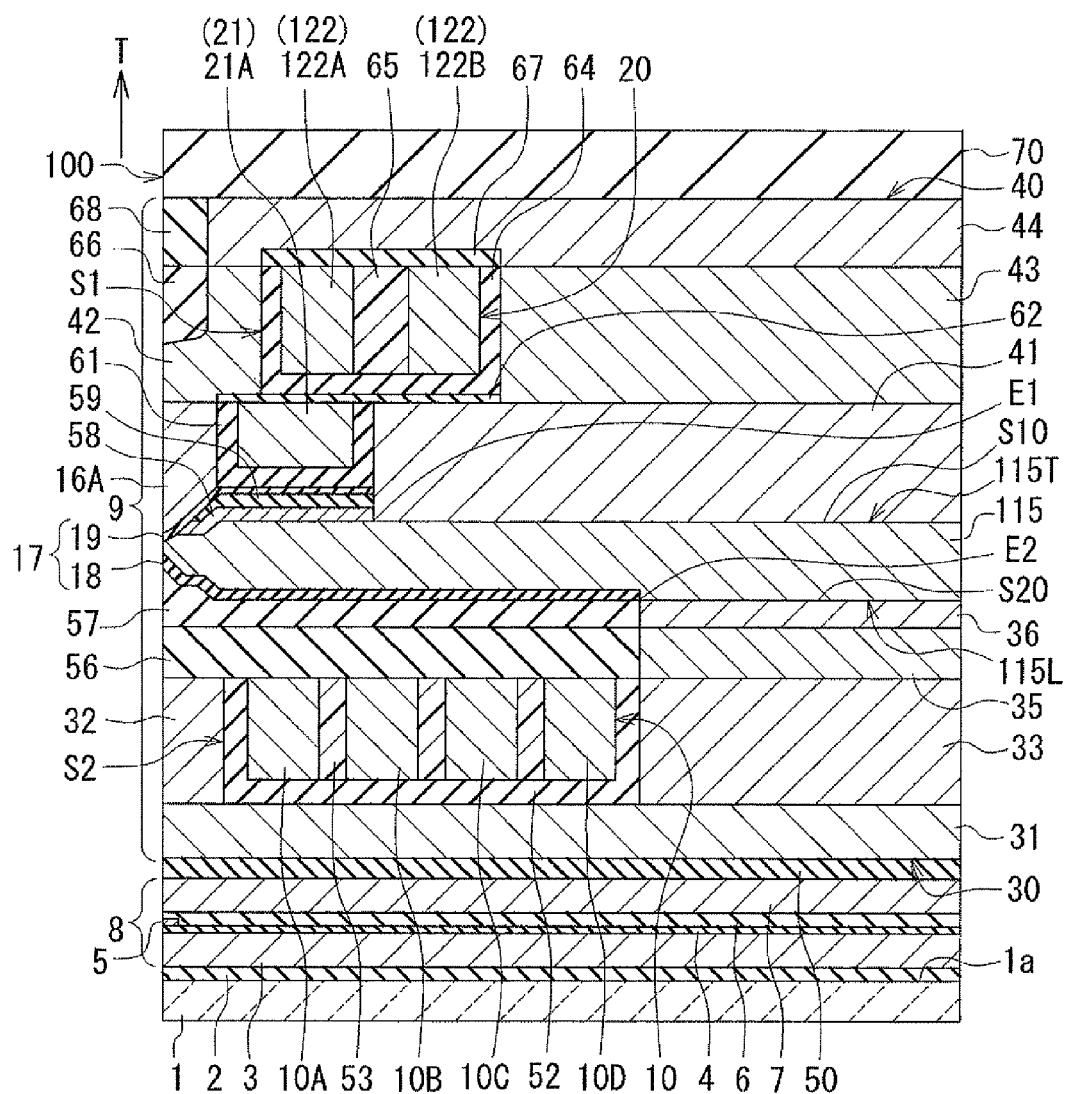
FIG. 11 is a cross-sectional view of a magnetic head according to a fourth embodiment of the invention.
Figure 12:
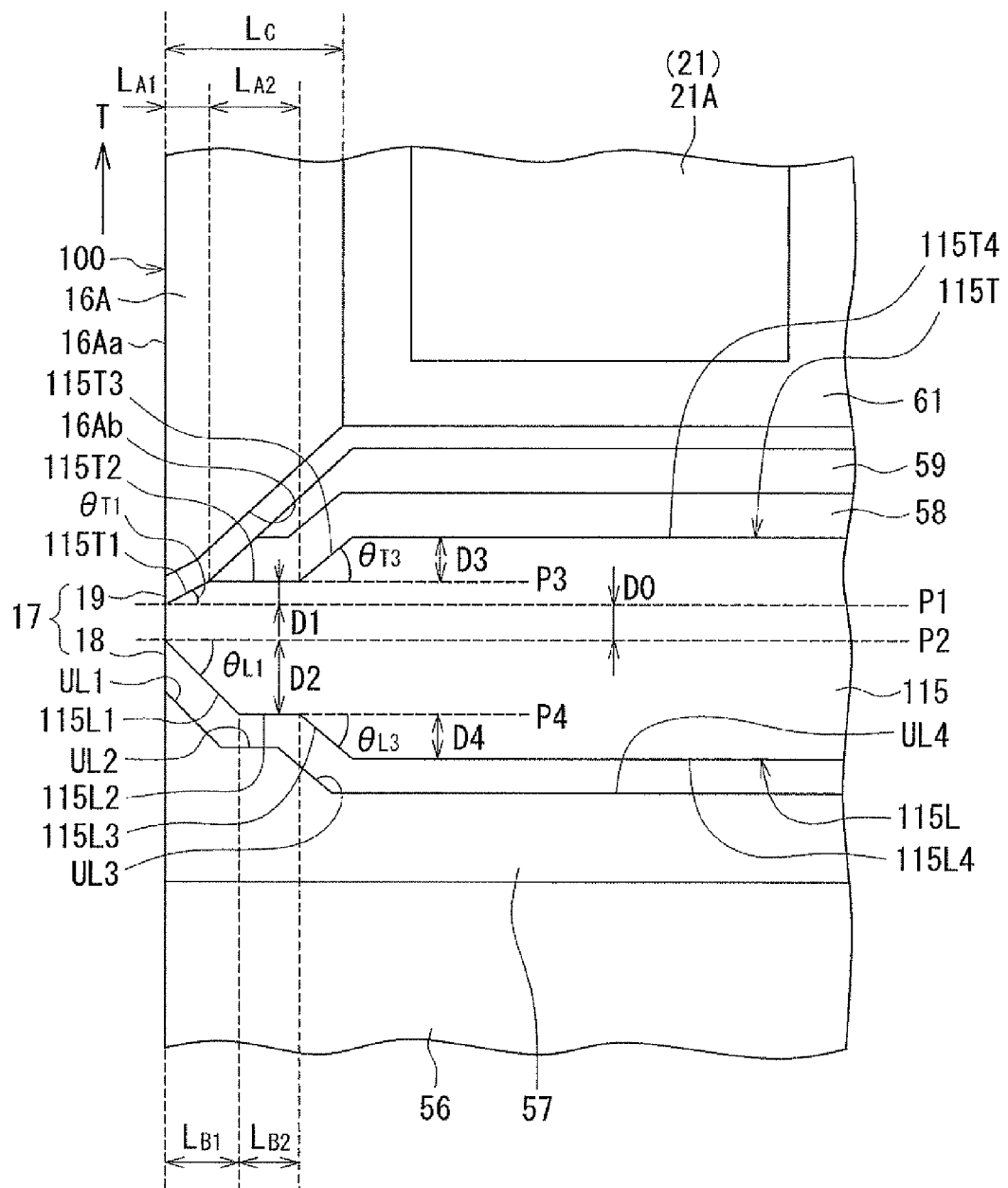
FIG. 12 is a cross-sectional view showing a part of a main pole in the vicinity of the medium facing surface in the magnetic head according to the fourth embodiment of the invention.

A magnetic head according to a fourth embodiment of the invention will now be described with reference to FIG. 11 and FIG. 12. FIG. 11 is a cross-sectional view of the magnetic head according to the present embodiment. FIG. 12 is a cross-sectional view showing a part of a main pole in the vicinity of the medium facing surface in the magnetic head according to the present embodiment. Note that FIG. 11 and FIG. 12 each show a cross section perpendicular to the medium facing surface and the top surface of the substrate, or the main cross section, in particular.

The configuration of the magnetic head according to the present embodiment is different from that of the magnetic head according to the second embodiment in the following respects. The magnetic head according to the present embodiment has a main pole 115 instead of the main pole 15 of the second embodiment. The main pole 115 has: a top surface 115T which is a surface located at a forward end in the direction T of travel of the recording medium; a bottom end 115L opposite to the top surface 115T; and first and second side parts (not shown) that are opposite to each other in the track width direction TW. The material, shape, and location of the main pole 115 are the same as those of the main pole 15 except for the shapes of the top surface 115T and the bottom end 115L.

The magnetic head according to the present embodiment is without the second shield 16B, the magnetic layer 34, and the insulating layer 55. The insulating layer 56 is disposed over the top surfaces of the second coil 10, the magnetic layer 32, the insulating film 52, and the insulating layers 53 and 54. Each of the magnetic layers 31 and 32 has an end face that is located in the medium facing surface 100 at a position backward of the end face of the main pole 115 in the direction T of travel of the recording medium. The second return path section 30 has an end face located in the medium facing surface 100 at a position backward of the end face of the main pole 115 in the direction T of travel of the recording medium. The aforementioned end face of the second return path section 30 consists of the end face of the magnetic layer 31 and the end face of the magnetic layer 32. The second connecting surface of the magnetic layer 42 is parallel to the medium facing surface 100.

The shapes of the top surface 115T and the bottom end 115L of the main pole 115 will now be described in detail with reference to FIG. 12. Each of the top surface 115T and the bottom end 115L of the main pole 115 includes a first, a second, a third, and a fourth portion that are contiguously arranged in this order of increasing distance from the medium facing surface 100. The first portion, the second portion, the third portion, and the fourth portion of the top surface 115T will hereinafter be represented by the symbols 115T1, 115T2, 115T3, and 115T4, respectively. The first portion, the second portion, the third portion, and the fourth portion of the bottom end 115L will hereinafter be represented by the symbols 115L1, 115L2, 115L3, and 115L4, respectively.

The first portion 115T1 of the top surface 115T has a first end located in the medium facing surface 100 and a second end opposite to the first end. The second portion 115T2 is connected to the second end of the first portion 115T1. The third portion 115T3 has a third end connected to the second portion 115T2 and a fourth end that is located farther from the medium facing surface 100 than is the third end. The fourth portion 115T4 is connected to the fourth end of the third portion 115T3.

The first portion 115L1 of the bottom end 115L has a first end located in the medium facing surface 100 and a second end opposite to the first end. The second portion 115L2 is connected to the second end of the first portion 115L1. The third portion 115L3 has a third end connected to the second portion 115L2 and a fourth end that is located farther from the medium facing surface 100 than is the third end. Each of the first to third portions 115L1 to 115L3 may be an edge formed by two intersecting planes, or may be a plane connecting two planes to each other. The fourth portion 115L4 is a plane connected to the fourth end of the third portion 115L3.

The end face of the main pole 115 has an end located forward in the direction T of travel of the recording medium and an end located backward in the direction T of travel of the recording medium. The end of the end face of the main pole 115 located forward in the direction T of travel of the recording medium also serves as the first end of the first portion 115T1 of the top surface 115T. The end of the end face of the main pole 115 located backward in the direction T of travel of the recording medium also serves as the first end of the first portion 115L1 of the bottom end 115L. Here, as shown in FIG. 12, assume a first virtual plane P1 and a second virtual plane P2. The first virtual plane P1 passes through the end of the end face of the main pole 115 located forward in the direction T of travel of the recording medium (the first end of the first portion 115T1 of the top surface 115T) and is perpendicular to the medium facing surface 100 and to the direction T of travel of the recording medium. The second virtual plane P2 passes through the end of the end face of the main pole 115 located backward in the direction T of travel of the recording medium (the first end of the first portion 115L1 of the bottom end 115L) and is perpendicular to the medium facing surface 100 and to the direction T of travel of the recording medium.

The first portion 115T1 of the top surface 115T is inclined relative to the first and second virtual planes P1 and P2 and the medium facing surface 100 such that the second end of the first portion 115T1 is located farther from the first and second virtual planes P1 and P2 than is the first end of the first portion 115T1. In other words, the first portion 115T1 is inclined such that the second end of the first portion 115T1 is located forward of the first end of the first portion 115T1 in the direction T of travel of the recording medium. The second and fourth portions 115T2 and 115T4 are substantially parallel to the first and second virtual planes P1 and P2. The third portion 115T3 is inclined relative to the first and second virtual planes P1 and P2 and the medium facing surface 100 such that the fourth end of the third portion 115T3 is located farther from the first and second virtual planes P1 and P2 than is the third end of the third portion 115T3. In other words, the third portion 115T3 is inclined such that the fourth end of the third portion 115T3 is located forward of the third end of the third portion 115T3 in the direction T of travel of the recording medium.

The first portion 115L1 of the bottom end 115L is inclined relative to the first and second virtual planes P1 and P2 and the medium facing surface 100 such that the second end of the first portion 115L1 is located farther from the first and second virtual planes P1 and P2 than is the first end of the first portion 115L1. In other words, the first portion 115L1 is inclined such that the second end of the first portion 115L1 is located backward of the first end of the first portion 115L1 in the direction T of travel of the recording medium. The second and fourth portions 115L2 and 115L4 are substantially parallel to the first and second virtual planes P1 and P2. The third portion 115L3 is inclined relative to the first and second virtual planes P1 and P2 and the medium facing surface 100 such that the fourth end of the third portion 115L3 is located farther from the first and second virtual planes P1 and P2 than is the third end of the third portion 115L3. In other words, the third portion 115L3 is inclined such that the fourth end of the third portion 115L3 is located backward of the third end of the third portion 115L3 in the direction T of travel of the recording medium.

The first shield 16A includes a portion interposed between the third portion 115T3 of the top surface 115T and the medium facing surface 100. As has been described in relation to the first embodiment, the first shield 16A has the first slope 16Ab serving as the bottom surface. In the present embodiment, the first slope 16Ab includes a portion that is opposed to the first portion 115T1 of the top surface 115T with the first gap layer 19 of the gap part 17 interposed therebetween. The first slope 16Ab is inclined relative to the first and second virtual planes P1 and P2 and the medium facing surface 100.

In the present embodiment, the top surface of the nonmagnetic layer 57 includes a slope UL1, a flat portion UL2, a slope UL3, and a bottom portion UL4. The slopes UL1 and UL3 are inclined relative to the first and second virtual planes P1 and P2 and the medium facing surface 100. The flat portion UL2 and the bottom portion UL4 are substantially parallel to the first and second virtual planes P1 and P2. The first to fourth portions 115L1, 115L2, 115L3, and 115L4 are opposed to the slope UL1, the flat portion UL2, the slope UL3, and the bottom portion UL4, respectively, with the second gap layer 18 of the gap part 17 interposed therebetween. Here, as shown in FIG. 12, the length of the first portion 115T1 of the top surface 115T in the direction perpendicular to the medium facing surface 100 will be represented by the symbol $L_{A1}$, the length of the first portion 115L1 of the bottom end 115L in the direction perpendicular to the medium facing surface 100 will be represented by the symbol $L_{B1}$, and the length of the first slope 16Ab in the direction perpendicular to the medium facing surface 100 will be represented by the symbol $L_C$. In the present embodiment, the length $L_{A1}$ is smaller than the lengths $L_{B1}$ and $L_C$. The length $L_{A1}$ falls within the range of 0.05 to 0.15 μm, for example. The length $L_{B1}$ falls within the range of 0.1 to 0.5 μm, for example. The length $L_C$ falls within the range of 0.2 to 0.6 μm, for example.

As shown in FIG. 12, the length of the second portion 115T2 of the top surface 115T in the direction perpendicular to the medium facing surface 100 will be represented by the symbol $L_{A2}$, and the length of the second portion 115L2 of the bottom end 115L in the direction perpendicular to the medium facing surface 100 will be represented by the symbol $L_{B2}$. The length $L_{A2}$ falls within the range of 0.2 to 0.6 μm, for example. The length $L_{B2}$ falls within the range of 0.2 to 0.6 μm, for example.

Note that FIG. 12 is illustrated such that the distance from the medium facing surface 100 to the boundary between the second portion 115T2 and the third portion 115T3 of the top surface 115T (which is the same as the sum of the length $L_{A1}$ and the length $L_{A2}$) is equal to the distance from the medium facing surface 100 to the boundary between the second portion 115L2 and the third portion 115L3 of the bottom end 115L (which is the same as the sum of the length $L_{B1}$ and the length $L_{B2}$). However, these distances may be different from each other. FIG. 12 is also illustrated such that the distance from the medium facing surface 100 to the boundary between the third portion 115T3 and the fourth portion 115T4 of the top surface 115T is equal to the distance from the medium facing surface 100 to the boundary between the third portion 115L3 and the fourth portion 115L4 of the bottom end 115L. However, these distances may be different from each other. Note that the length of the track width defining portion in the direction perpendicular to the medium facing surface 100, i.e., the neck height, can be set to any value independently of the lengths $L_{A1}$ and $L_{B1}$ and the distances mentioned above.

As shown in FIG. 12, the angle of inclination of the first portion 115T1 of the top surface 115T relative to the first virtual plane P1 will be represented by the symbol $\theta_{T1}$, and the angle of inclination of the first portion 115L1 of the bottom end 115L relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

As shown in FIG. 12, assume also a virtual plane P3 and a virtual plane P4. The virtual plane P3 passes through the third end of the third portion 115T3 of the top surface 115T and is parallel to the first and second virtual planes P1 and P2. The virtual plane P4 passes through the third end of the third portion 115L3 of the bottom end 115L and is parallel to the first and second virtual planes P1 and P2. The angle of inclination of the third portion 115T3 relative to the virtual plane P3 will be represented by the symbol $\theta_{T3}$, and the angle of inclination of the third portion 115L3 relative to the virtual plane P4 will be represented by the symbol $\theta_{L3}$. The angles of inclination $\theta_{T3}$ and $\theta_{L3}$ both fall within the range of 22° to 60°, for example.

The second and fourth portions 115T2 and 115T4 of the top surface 115T and the second and fourth portions 115L2 and 115L4 of the bottom end 115L are substantially parallel to the first and second virtual planes P1 and P2. As shown in FIG. 12, the thickness of the main pole 115 in the medium facing surface 100, i.e., the distance between the first virtual plane P1 and the second virtual plane P2, will be represented by the symbol D0. The distance between the second portion 115T2 of the top surface 115T and the first virtual plane P1 will be represented by the symbol D1. The distance between the second portion 115L2 of the bottom end 115L and the second virtual plane P2 will be represented by the symbol D2. In the present embodiment, the distance D2 is greater than the distance D1. The distance D0 falls within the range of 0.05 to 0.1 μm, for example. The distance D1 falls within the range of 0.02 to 0.1 µm, for example. The distance D2 falls within the range of 0.1 to 0.5 µm, for example.

The distance between the fourth portion 115T4 of the top surface 115T and the virtual plane P3 will be represented by the symbol D3. The distance between the fourth portion 115L4 of the bottom end 115L and the virtual plane P4 will be represented by the symbol D4. The distances D3 and D4 both fall within the range of 0.1 to 0.5 µm, for example.

As has been described, in the present embodiment the top surface 115T of the main pole 115 includes the first and third portions 115T1 and 115T3 which are inclined relative to the first and second virtual planes P1 and P2 and the medium facing surface 100. According to the present embodiment, this makes it possible to reduce the thickness of the main pole 115 in the medium facing surface 100 and sufficiently increase the thickness of a portion of the main pole 115 that is located farther from the medium facing surface 100 than is the third portion 115T3. Furthermore, in the present embodiment, the bottom end 115L of the main pole 115 includes the first and third portions 115L1 and 115L3 which are inclined relative to the first and second virtual planes P1 and P2 and the medium facing surface 100. According to the present embodiment, this makes it possible to reduce the thickness of the main pole 115 in the medium facing surface 100 and sufficiently increase the thickness of a portion of the main pole 115 that is located farther from the medium facing surface 100 than is the third portion 115L3. According to the present embodiment, since the main pole 115 has a small thickness in the medium facing surface 100, it is possible to prevent adjacent track erasure induced by a skew. On the other hand, since a portion of the main pole 115 away from the medium facing surface 100 has a large thickness, it is possible for the main pole 115 to direct much magnetic flux to the medium facing surface 100, and this makes it possible to improve write characteristics such as the overwrite property.

The first shield 16A includes a portion interposed between the medium facing surface 100 and the third portion 115T3 of the top surface 115T. A smaller distance between the third portion 115T3 and the first shield 16A would increase magnetic flux leakage from the third portion 115T3 to the first shield 16A and thereby cause degradation of write characteristics.

In the present embodiment, the top surface 115T of the main pole 115 includes the second portion 115T2. This makes the distance between the third portion 115T3 and the first shield 16A greater than that in the case where the second portion 115T2 is not provided. According to the present embodiment, it is thus possible to prevent degradation in write characteristics induced by magnetic flux leakage from the main pole 115 to the first shield 16A.

In the present embodiment, the top surface 115T is configured so that the second and fourth portions 115T2 and 115T4 are substantially parallel to the first and second virtual planes P1 and P2 while the third portion 115T3 is inclined relative to the first and second virtual planes P1 and P2 and the medium facing surface 100. Consequently, as compared with a case where the third portion 115T3 is perpendicular to the first and second virtual planes P1 and P2, the present embodiment makes it possible to increase the angles of two corners that are formed between the third portion 115T3 and the second and fourth portions 115T2 and 115T4 and thereby prevent magnetic flux leakage from these corners to the first shield 16A.

In the present embodiment, the bottom end 115L is configured so that the second and fourth portions 115L2 and 115L4 are substantially parallel to the first and second virtual planes P1 and P2 while the third portion 115L3 is inclined relative to the first and second virtual planes P1 and P2 and the medium facing surface 100. Consequently, as compared with a case where the third portion 115L3 is perpendicular to the first and second virtual planes P1 and P2, the present embodiment makes it possible to increase the angles of two corners that are formed between the third portion 115L3 and the second and fourth portions 115L2 and 115L4 and thereby prevent magnetic flux leakage from these corners.

According to the present embodiment, the above-described features of the shape of the main pole 115 make it possible to prevent the skew-induced problems and provide improved write characteristics.

In the present embodiment, the second return path section 30 has an end face located in the medium facing surface 100 at a position backward of the end face of the main pole 115 in the direction T of travel of the recording medium. The aforementioned end face of the second return path section 30 consists of the end face of the magnetic layer 31 and the end face of the magnetic layer 32. The aforementioned end face of the second return path section 30 (the end faces of the magnetic layers 31 and 32) captures a disturbance magnetic field applied to the magnetic head from the outside thereof. A part of the magnetic flux that has been produced from the end face of the main pole 115 and has magnetized the recording medium flows back to the main pole 115 through the aforementioned end face of the second return path section 30.

The first coil 20 of the present embodiment may include the second layer 22 which has been described in relation to the first embodiment, instead of the second layer 122. The remainder of configuration, function and effects of the present embodiment are similar to those of the first or second embodiment.

Fifth Embodiment

Figure 13:
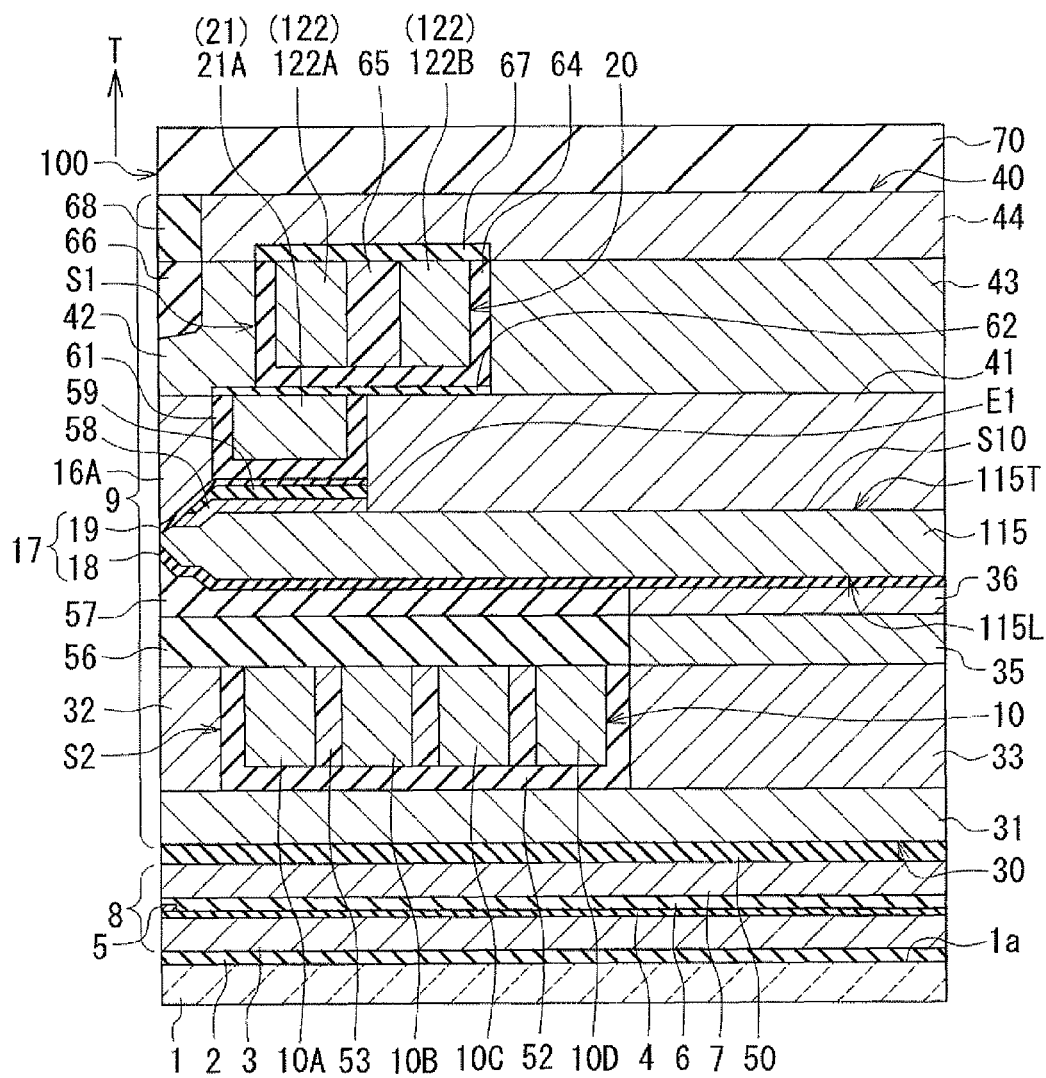
FIG. 13 is a cross-sectional view of a magnetic head according to a fifth embodiment of the invention.

A magnetic head according to a fifth embodiment of the invention will now be described with reference to FIG. 13. FIG. 13 is a cross-sectional view of the magnetic head according to the present embodiment. Note that FIG. 13 shows a cross section perpendicular to the medium facing surface and the top surface of the substrate, or the main cross section, in particular.

The configuration of the magnetic head according to the present embodiment is different from that of the magnetic head according to the fourth embodiment in the following respects. In the magnetic head according to the present embodiment, the bottom end 115L of the main pole 115 is not in contact with the top surface of the magnetic layer 36. The second gap layer 18 of the gap part 17 is arranged to extend along the sidewalls of the side shields 16C and 16D, the top surface of the nonmagnetic layer 57, and the top surface of the magnetic layer 36. The core part (the magnetic layers 33, 35, and 36) of the second return path section 30 has an end face that is opposed to a part of the main pole 115 away from the medium facing surface 100 with the second gap layer 18 interposed therebetween. The aforementioned end face of the core part is the top surface of the magnetic layer 36. A part of the second gap layer 18 that is interposed between the part of the main pole 115 away from the medium facing surface 100 and the aforementioned end face of the core part (the top surface of the magnetic layer 36) of the second return path section 30 corresponds to the "nonmagnetic layer" according to the invention.

In the present embodiment, the core part (the magnetic layers 33, 35, and 36) of the second return path section 30 is not connected to the main pole 115. However, since the aforementioned end face of the core part (the top surface of the magnetic layer 36) of the second return path section 30 is sufficiently close to the bottom end 115L of the main pole 115, the magnetic flux passing through the second return magnetic path 30 can be directed into the main pole 115.

The remainder of configuration, function and effects of the present embodiment are similar to those of the fourth embodiment.

The present invention is not limited to the foregoing embodiments, and various modifications may be made thereto. For example, the first coil 20 may include either one of the first layer and the second layer. Furthermore, as far as the requirements of the appended claims are met, the number of the first coil elements and the number of the second coil elements may be arbitrarily chosen without being limited to the examples illustrated in each of the foregoing embodiments.

In each of the foregoing embodiments, the side shields 16C and 16D may be omitted.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
    a medium facing surface that faces a recording medium;
    a first coil and a second coil that produce magnetic fields corresponding to data to be written on a recording medium;
    a main pole that has an end face located in the medium facing surface, allows magnetic fluxes corresponding to the magnetic fields produced by the first and second coils to pass, and produces a write magnetic field for writing the data on a recording medium by means of a perpendicular magnetic recording system;
    a first shield made of a magnetic material and having an end face that is located in the medium facing surface at a position forward of the end face of the main pole in a direction of travel of a recording medium;
    a gap part made of a nonmagnetic material and interposed between the main pole and the first shield; and
    a first return path section and a second return path section that are each made of a magnetic material, wherein:
    the first return path section is located forward of the main pole in the direction of travel of a recording medium and connects the first shield and a part of the main pole away from the medium facing surface to each other so that a first space is defined by the main pole, the gap part, the first shield, and the first return path section;
    the second return path section is located backward of the main pole in the direction of travel of a recording medium so that a second space is defined by the main pole and the second return path section;
    the first coil includes at least one first coil element and a remaining portion, the first coil being located forward of the main pole in the direction of travel of a recording medium and wound around a part of the first return path section;
    the at least one first coil element of the first coil extends to pass through the first space;
    the remaining portion of the first coil does not exist in the first space;
    the second coil includes a plurality of second coil elements and a remaining portion, the second coil being located backward of the main pole in the direction of travel of a recording medium and wound around a part of the second return path section;
    the plurality of second coil elements of the second coil extend to pass through the second space;
    the remaining portion of the second coil does not exist in the second space;
    a minimum distance between the first shield and the main pole is smaller than a minimum distance between the at least one first coil element and the main pole; and
    the at least one first coil element is smaller in number than the plurality of second coil elements.

2. The magnetic head for perpendicular magnetic recording according to claim 1, wherein:
    the second return path section includes a core part that is located farther from the medium facing surface than are the plurality of second coil elements; and
    the second coil is wound around the core part.

3. The magnetic head for perpendicular magnetic recording according to claim 2, wherein the core part is connected to the part of the main pole away from the medium facing surface.

4. The magnetic head for perpendicular magnetic recording according to claim 2, wherein the core part has an end face that faces the part of the main pole away from the medium facing surface,
    the magnetic head further comprising a nonmagnetic layer interposed between the end face of the core part and the part of the main pole away from the medium facing surface.

5. The magnetic head for perpendicular magnetic recording according to claim 1, wherein the second return path section has an end face that is located the medium facing surface at a position backward of the end face of the main pole in the direction of travel of a recording medium.

6. The magnetic head for perpendicular magnetic recording according to claim 5, wherein the second return path section includes a portion interposed between the medium facing surface and the plurality of second coil elements.

7. The magnetic head for perpendicular magnetic recording according to claim 5, wherein the second return path section is connected to the part of the main pole away from the medium facing surface.

8. The magnetic head for perpendicular magnetic recording according to claim 1, wherein:
    the second return path section is connected to the part of the main pole away from the medium facing surface;
    a first interface is formed between the first return path section and the main pole;
    a second interface is formed between the second return path section and the main pole; and
    the first interface has a first end that is closest to the medium facing surface, the second interface has a second end that is closest to the medium facing surface, and the first end is located closer to the medium facing surface than is the second end.

9. The magnetic head for perpendicular magnetic recording according to claim 1, further comprising a second shield made of a magnetic material and having an end face that is located in the medium facing surface at a position backward of the end face of the main pole in the direction of travel of a recording medium, wherein:
    the second return path section is connected to the second shield; and
    a minimum distance between the second shield and the main pole is smaller than a minimum distance between the main pole and the plurality of second coil elements.

10. The magnetic head for perpendicular magnetic recording according to claim 9, wherein the second return path section connects the second shield and the part of the main pole away from the medium facing surface to each other.

11. The magnetic head for perpendicular magnetic recording according to claim 1, further comprising two side shields that are each made of a magnetic material and that have two end faces located in the medium facing surface at positions on opposite sides of the end face of the main pole in a track width direction.

* * * * *